United States Patent
Suzuki et al.

(10) Patent No.: US 9,809,081 B2
(45) Date of Patent: Nov. 7, 2017

(54) VEHICLE AIR CONDITIONING APPARATUS

(71) Applicant: SANDEN HOLDINGS CORPORATION, Isesaki-shi, Gunma (JP)

(72) Inventors: Kenichi Suzuki, Isesaki (JP); Hidenori Takei, Isesaki (JP)

(73) Assignee: SANDEN HOLDINGS CORPORATION, Isesaki-Shi, Gunma (JP)

( * ) Notice: Subject to any disclaimer, the term of this patent is extended or adjusted under 35 U.S.C. 154(b) by 590 days.

(21) Appl. No.: 14/363,892

(22) PCT Filed: Nov. 26, 2012

(86) PCT No.: PCT/JP2012/080470
§ 371 (c)(1),
(2) Date: Jun. 9, 2014

(87) PCT Pub. No.: WO2013/084737
PCT Pub. Date: Jun. 13, 2013

(65) Prior Publication Data
US 2014/0373562 A1 Dec. 25, 2014

(30) Foreign Application Priority Data
Dec. 9, 2011 (JP) .................................. 2011-270685

(51) Int. Cl.
*B60H 3/00* (2006.01)
*B61D 27/00* (2006.01)
(Continued)

(52) U.S. Cl.
CPC ..... *B60H 1/00021* (2013.01); *B60H 1/00921* (2013.01); *B60H 1/3227* (2013.01);
(Continued)

(58) Field of Classification Search
CPC ................ F25B 29/003; F25B 41/062; B60H 2001/00949; B60H 1/00907
(Continued)

(56) References Cited

U.S. PATENT DOCUMENTS 5,598,887 A 2/1997 Ikeda et al.
6,047,770 A * 4/2000 Suzuki ............... B60H 1/00007
165/202

(Continued)

FOREIGN PATENT DOCUMENTS

JP   H06-323674   11/1994
JP   H07-232547    9/1995
(Continued)

OTHER PUBLICATIONS

International Search Report dated Feb. 26, 2013, from corresponding International Application No. PCT/JP2012/080470.

*Primary Examiner* — Len Tran
*Assistant Examiner* — Paul Alvare
(74) *Attorney, Agent, or Firm* — Troutman Sanders LLP

(57) ABSTRACT

In a vehicle air conditioning apparatus, during a cooling operation, and a cooling and dehumidifying operation, a refrigerant flows through an outdoor heat exchanger, flows through a supercooling radiator, and then flows into a radiator to absorb heat. During a heating operation, the refrigerant flows through a heat exchanger and then is sucked into a compressor without passing through the supercooling radiator. During a first heating and dehumidifying operation, the refrigerant flows through another radiator, flows through the supercooling radiator, and then flows into another heat exchanger to absorb heat.

12 Claims, 32 Drawing Sheets

(51) Int. Cl.
  *F25B 29/00* (2006.01)
  *F25D 21/06* (2006.01)
  *B60H 1/00* (2006.01)
  *F25B 5/00* (2006.01)
  *F25B 6/02* (2006.01)
  *F25B 40/00* (2006.01)
  *F25B 41/00* (2006.01)
  *F25B 41/04* (2006.01)
  *F25B 47/02* (2006.01)
  *B60H 1/32* (2006.01)
  *F25B 1/00* (2006.01)
  *F25B 49/02* (2006.01)
  *F25B 6/04* (2006.01)

(52) U.S. Cl.
  CPC ............ *F25B 1/005* (2013.01); *F25B 5/00* (2013.01); *F25B 6/02* (2013.01); *F25B 6/04* (2013.01); *F25B 29/003* (2013.01); *F25B 40/00* (2013.01); *F25B 41/003* (2013.01); *F25B 41/04* (2013.01); *F25B 47/022* (2013.01); *F25B 49/02* (2013.01); *F25D 21/06* (2013.01); *B60H 1/00907* (2013.01); *F25B 2400/04* (2013.01); *F25B 2700/195* (2013.01); *F25B 2700/197* (2013.01); *F25B 2700/1931* (2013.01); *F25B 2700/1933* (2013.01); *F25B 2700/2106* (2013.01); *F25B 2700/21151* (2013.01); *F25B 2700/21152* (2013.01); *F25B 2700/21163* (2013.01); *F25B 2700/21175* (2013.01)

(58) Field of Classification Search
  USPC ...... 165/42, 202; 62/182, 196.4, 238.7, 210, 62/206, 156
  See application file for complete search history.

(56) References Cited

U.S. PATENT DOCUMENTS

| | | | |
|---|---|---|---|
| 6,347,528 B1* | 2/2002 | Iritani | B60H 1/00357 62/323.1 |
| 6,920,922 B2* | 7/2005 | Takeuchi | B60H 1/00921 165/202 |
| 2001/0018831 A1* | 9/2001 | Honda | B60H 1/3225 62/228.1 |
| 2002/0002841 A1 | 1/2002 | Izawa et al. | |
| 2009/0241573 A1* | 10/2009 | Ikegami | B60H 1/00335 62/238.7 |
| 2011/0167849 A1 | 7/2011 | Kobayashi et al. | |
| 2012/0279243 A1* | 11/2012 | Endo | B60H 1/00921 62/238.6 |

FOREIGN PATENT DOCUMENTS

| | | |
|---|---|---|
| JP | 2000-052757 | 2/2000 |
| JP | 2000-097521 | 4/2000 |
| JP | 2001-324237 | 11/2001 |
| JP | 2002-079821 | 3/2002 |
| JP | 2011-143796 | 7/2011 |

\* cited by examiner

FIG. 3
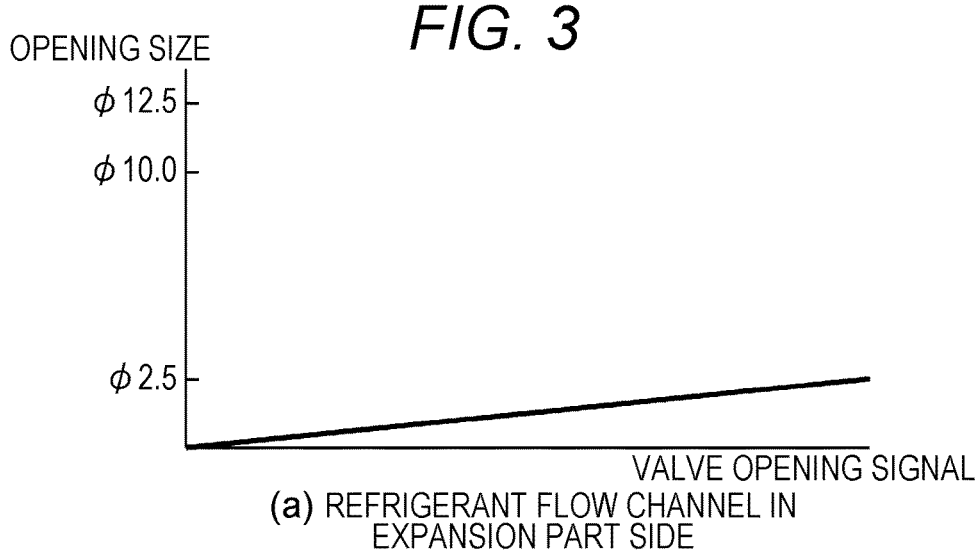
(a) REFRIGERANT FLOW CHANNEL IN EXPANSION PART SIDE
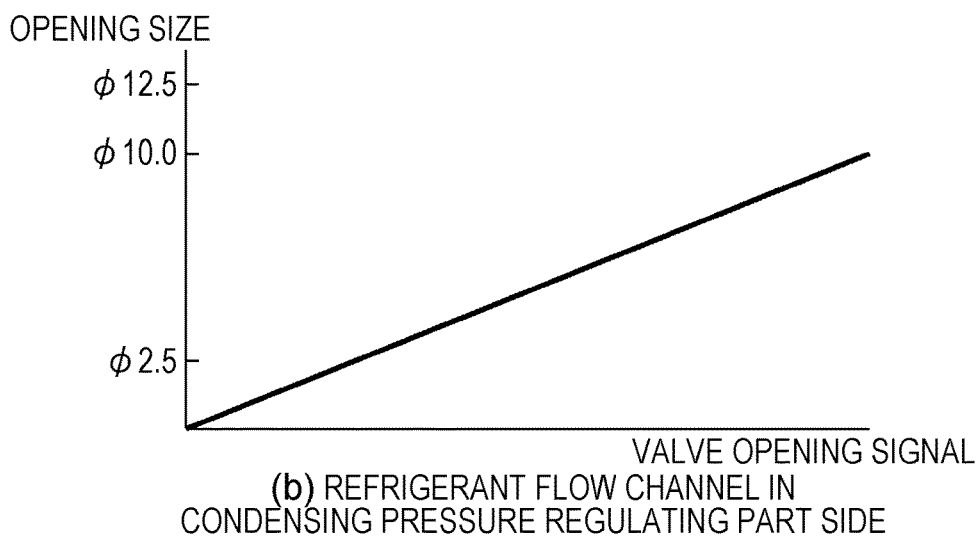
(b) REFRIGERANT FLOW CHANNEL IN CONDENSING PRESSURE REGULATING PART SIDE
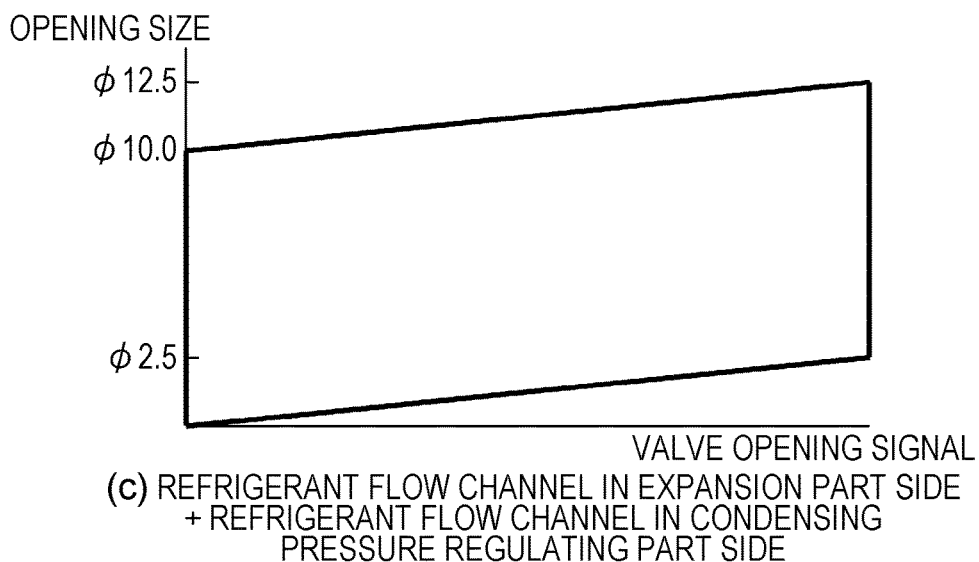
(c) REFRIGERANT FLOW CHANNEL IN EXPANSION PART SIDE + REFRIGERANT FLOW CHANNEL IN CONDENSING PRESSURE REGULATING PART SIDE

FIG. 9

| OPERATION | FIRST CONTROL VALVE | SECOND CONTROL VALVE | FIRST SOLENOID VALVE | SECOND SOLENOID VALVE | THIRD SOLENOID VALVE | FOURTH SOLENOID VALVE |
|---|---|---|---|---|---|---|
| COOLING, OR COOLING AND DEHUMIDIFYING OPERATION | CONDENSING PRESSURE REGULATING PART SIDE | OPENING CONTROLLED | OPEN | CLOSED | CLOSED | CLOSED |
| HEATING OPERATION | EXPANSION PART SIDE | OPENING NOT CONTROLLED | CLOSED | CLOSED | OPEN | CLOSED |
| FIRST HEATING AND DEHUMIDIFYING OPERATION | EXPANSION PART SIDE | OPENING CONTROLLED | CLOSED | OPEN | OPEN | CLOSED |
| SECOND HEATING AND DEHUMIDIFYING OPERATION | ALL CLOSED | OPENING CONTROLLED | CLOSED | OPEN | CLOSED | CLOSED |
| DEFROSTING OPERATION | EXPANSION PART SIDE | OPENING NOT CONTROLLED | CLOSED | CLOSED | OPEN | OPEN |

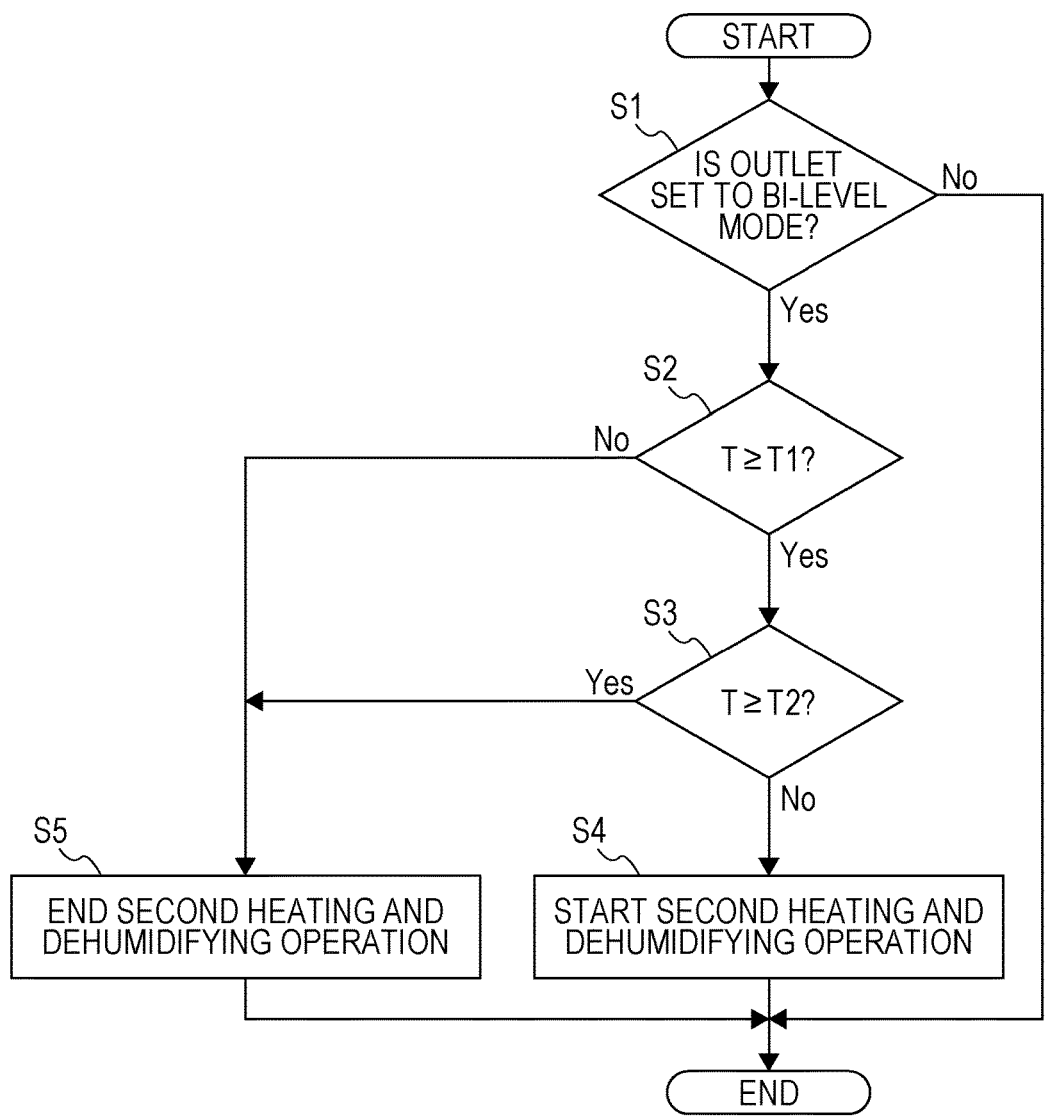

FIG. 14

| OPERATION | FIRST CONTROL VALVE | SECOND CONTROL VALVE | FIRST SOLENOID VALVE | SECOND SOLENOID VALVE | THIRD SOLENOID VALVE | FOURTH SOLENOID VALVE | FIFTH SOLENOID VALVE | SIXTH SOLENOID VALVE |
|---|---|---|---|---|---|---|---|---|
| COOLING, OR COOLING AND DEHUMIDIFYING OPERATION | CONDENSING PRESSURE REGULATING PART SIDE | OPENING CONTROLLED | OPEN | CLOSED | CLOSED | CLOSED | CLOSED | OPEN |
| HEATING OPERATION | EXPANSION PART SIDE | OPENING NOT CONTROLLED | CLOSED | CLOSED | OPEN | CLOSED | CLOSED | CLOSED |
| FIRST HEATING AND DEHUMIDIFYING OPERATION | EXPANSION PART SIDE | OPENING CONTROLLED | CLOSED | OPEN | OPEN | CLOSED | OPEN | CLOSED |
| SECOND HEATING AND DEHUMIDIFYING OPERATION | ALL CLOSED | OPENING CONTROLLED | CLOSED | OPEN | CLOSED | CLOSED | OPEN | CLOSED |
| DEFROSTING OPERATION | EXPANSION PART SIDE | OPENING NOT CONTROLLED | CLOSED | CLOSED | OPEN | OPEN | CLOSED | CLOSED |

FIG. 16

| OPERATION | FIRST CONTROL VALVE | SECOND CONTROL VALVE | FIRST SOLENOID VALVE | SECOND SOLENOID VALVE | THIRD SOLENOID VALVE | FOURTH SOLENOID VALVE | THREE-WAY SOLENOID VALVE |
|---|---|---|---|---|---|---|---|
| COOLING, OR COOLING AND DEHUMIDIFYING OPERATION | CONDENSING PRESSURE REGULATING PART SIDE | OPENING CONTROLLED | OPEN | CLOSED | CLOSED | CLOSED | SUPERCOOLING RADIATOR SIDE |
| HEATING OPERATION | EXPANSION PART SIDE | OPENING NOT CONTROLLED | CLOSED | CLOSED | OPEN | CLOSED | — |
| FIRST HEATING AND DEHUMIDIFYING OPERATION | EXPANSION PART SIDE | OPENING CONTROLLED | CLOSED | OPEN | OPEN | CLOSED | BYPASS SIDE |
| SECOND HEATING AND DEHUMIDIFYING OPERATION | ALL CLOSED | OPENING CONTROLLED | CLOSED | OPEN | CLOSED | CLOSED | BYPASS SIDE |
| DEFROSTING OPERATION | EXPANSION PART SIDE | OPENING NOT CONTROLLED | CLOSED | CLOSED | OPEN | OPEN | — |

FIG. 18

| OPERATION | FIRST CONTROL VALVE | SECOND CONTROL VALVE | FIRST SOLENOID VALVE | SECOND SOLENOID VALVE | THIRD SOLENOID VALVE | FOURTH SOLENOID VALVE |
|---|---|---|---|---|---|---|
| COOLING, OR COOLING AND DEHUMIDIFYING OPERATION | CONDENSING PRESSURE REGULATING PART SIDE | OPENING CONTROLLED | OPEN | CLOSED | CLOSED | CLOSED |
| HEATING OPERATION | EXPANSION PART SIDE | OPENING NOT CONTROLLED | CLOSED | CLOSED | OPEN | CLOSED |
| FIRST HEATING AND DEHUMIDIFYING OPERATION | EXPANSION PART SIDE | OPENING CONTROLLED | CLOSED | OPEN | OPEN | CLOSED |
| SECOND HEATING AND DEHUMIDIFYING OPERATION | ALL CLOSED | OPENING CONTROLLED | CLOSED | OPEN | CLOSED | CLOSED |
| DEFROSTING OPERATION | EXPANSION PART SIDE | OPENING NOT CONTROLLED | CLOSED | CLOSED | OPEN | OPEN |

FIG. 23
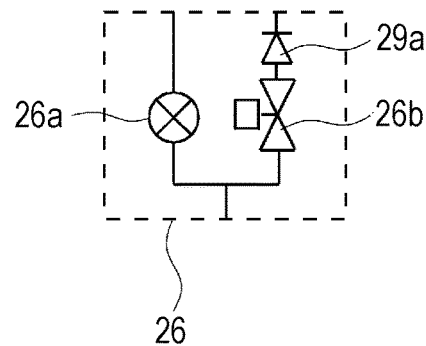
(a)
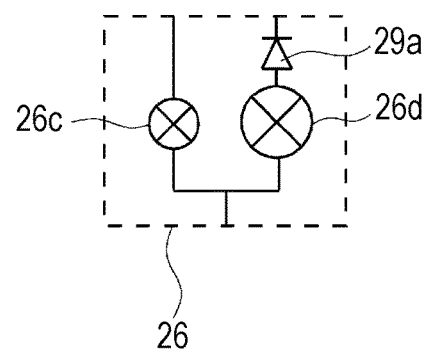
(b)
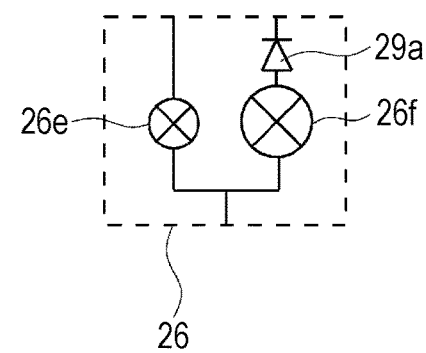
(c)

FIG. 29

| OPERATION | FIRST CONTROL VALVE | SECOND CONTROL VALVE | FIRST SOLENOID VALVE | SECOND SOLENOID VALVE | THIRD SOLENOID VALVE | FOURTH SOLENOID VALVE |
|---|---|---|---|---|---|---|
| COOLING, OR COOLING AND DEHUMIDIFYING OPERATION | CONDENSING PRESSURE REGULATING PART SIDE | OPENING CONTROLLED | OPEN | CLOSED | CLOSED | CLOSED |
| HEATING OPERATION | EXPANSION PART SIDE | OPENING NOT CONTROLLED | CLOSED | CLOSED | OPEN | CLOSED |
| FIRST HEATING AND DEHUMIDIFYING OPERATION | EXPANSION PART SIDE | OPENING CONTROLLED | CLOSED | OPEN | OPEN | CLOSED |
| SECOND HEATING AND DEHUMIDIFYING OPERATION | ALL CLOSED | OPENING CONTROLLED | CLOSED | OPEN | CLOSED | CLOSED |
| DEFROSTING OPERATION | EXPANSION PART SIDE | OPENING NOT CONTROLLED | CLOSED | CLOSED | OPEN | OPEN |

FIG. 31

| OPERATION | FIRST CONTROL VALVE | SECOND CONTROL VALVE | FIRST SOLENOID VALVE | SECOND SOLENOID VALVE | THIRD SOLENOID VALVE | FOURTH SOLENOID VALVE |
|---|---|---|---|---|---|---|
| COOLING, OR COOLING AND DEHUMIDIFYING OPERATION | CONDENSING PRESSURE REGULATING PART SIDE | OPENING CONTROLLED | OPEN | CLOSED | CLOSED | CLOSED |
| HEATING OPERATION | EXPANSION PART SIDE | OPENING NOT CONTROLLED | CLOSED | CLOSED | OPEN | CLOSED |
| FIRST HEATING AND DEHUMIDIFYING OPERATION | EXPANSION PART SIDE | OPENING CONTROLLED | CLOSED | OPEN | OPEN | CLOSED |
| SECOND HEATING AND DEHUMIDIFYING OPERATION | ALL CLOSED | OPENING CONTROLLED | CLOSED | OPEN | CLOSED | CLOSED |
| DEFROSTING OPERATION | EXPANSION PART SIDE | OPENING NOT CONTROLLED | CLOSED | CLOSED | OPEN | OPEN |

VEHICLE AIR CONDITIONING APPARATUS

CROSS-REFERENCE TO RELATED APPLICATIONS

This is a U.S. national phase application under 35 U.S.C. §371 of International Patent Application No. PCT/JP2012/080470, filed on Nov. 26, 2012, and claims benefit of priority to Japanese Patent Application No. 2011-270685, filed Dec. 9, 2011. The International Application was published on Jun. 13, 2013, as International Publication No. WO 2013/084737 under PCT Article 21(2). The entire contents of these applications are hereby incorporated by reference.

TECHNICAL FIELD

The present invention relates to a vehicle air conditioning apparatus applicable to, for example, electric cars.

BACKGROUND ART

Conventionally, this sort of vehicle air conditioning apparatus includes: a compressor driven by an engine as a power source of a vehicle; a radiator provided outside the vehicle interior; and a heat exchanger provided in the vehicle interior. With this vehicle air conditioning apparatus, a cooling operation is performed by: releasing the heat from the refrigerant discharged from the compressor in the radiator; absorbing the heat into the refrigerant in the heat exchanger; and supplying the air subjected to a heat exchange with the refrigerant in the heat exchanger to the vehicle interior. In addition, such a conventional vehicle air conditioning apparatus includes a heater core and perform a heating operation by: releasing the exhaust heat from the cooling water used to cool the engine in the heater core; and blowing the air subjected to a heat exchange with the cooling water in the heater core to the vehicle interior. Moreover, such a conventional vehicle air conditioning apparatus performs a heating and dehumidifying operation by: cooling the air to be supplied to the vehicle interior to a required absolute humidity in the heat exchanger for dehumidification; heating the cooled and dehumidified air in the heat exchanger to a desired temperature in the heater core; and blowing the heated air to the vehicle interior.

The above-mentioned vehicle air conditioning apparatus uses the exhaust heat from the engine as a heat source to heat the air for a heating operation, or a heating and dehumidifying operation. Generally, an electric car uses an electric motor as a power source, and it is difficult to acquire the exhaust heat that can heat the air by using the electric motor without an engine. Therefore, the above-mentioned vehicle air conditioning apparatus is not applicable to electric cars.

To address this issue, there has been known a vehicle air conditioning apparatus which is applicable to electric cars. The vehicle air conditioning apparatus includes: a compressor configured to compress and discharge a refrigerant; a radiator configured to release the heat from the refrigerant; a heat exchanger configured to absorb the heat into the refrigerant; an outdoor heat exchanger configured to release the heat from or absorb the heat into the refrigerant; a heating operation refrigerant circuit configured to allow the refrigerant discharged from the compressor to flow into the radiator, to allow the refrigerant having passed through the radiator to flow into the outdoor heat exchanger via the expansion part, and to allow the refrigerant having passed through the outdoor heat exchanger to flow into the compressor; a heating and dehumidifying refrigerant circuit configured to allow the refrigerant discharged from the compressor to flow into the radiator, to allow part of the refrigerant having passed through the radiator to flow into the heat exchanger via the expansion part, to allow the remaining refrigerant to flow into the outdoor heat exchanger via the expansion part, and to allow the refrigerant having passed through the heat exchanger and the refrigerant having passed through the outdoor heat exchanger to be sucked into the compressor; and a cooling and dehumidifying refrigerant circuit configured to allow the refrigerant discharged from the compressor to flow into the radiator, to allow the refrigerant having passed through the radiator to flow into the outdoor heat exchanger, to allow the refrigerant having passed through the outdoor heat exchanger to flow into the heat exchanger via the expansion part, and to allow the refrigerant having passed through the heat exchanger to be sucked into the compressor (see, for example, Patent Literature 1).

CITATION LIST

Patent Literature

PTL1: Japanese Patent Application Laid-Open No. 2001-324237

SUMMARY OF INVENTION

Technical Problem

It has been known that the vehicle air conditioning apparatus may improve the efficiency of the cooling operation and the cooling and dehumidifying operation by releasing the heat from the refrigerant to supercool the refrigerant in the cooling/cooling and dehumidifying refrigerant circuit when the refrigerant is decompressed in the outdoor heat exchanger. In order to release the heat from the refrigerant to supercool the refrigerant in the outdoor heat exchanger, a supercooling part is provided to flow refrigerant into the outdoor heat exchanger in the downstream side of the refrigerant flow direction.

However, in a case in which the supercooling part is provided in the outdoor heat exchanger, if a refrigerant circuit in addition to the cooling/cooling and dehumidifying refrigerant circuit is provided, pressure loss is increased because the refrigerant flows through the supercooling part. This may cause a decrease in efficiency in operations other than the cooling operation and the cooling/cooling and dehumidifying operation.

It is therefore an object of the present invention to provide a vehicle air conditioning apparatus that can decrease pressure loss, and therefore improve the efficiency of air conditioning operation.

Solution to Problem

To achieve the object, the vehicle air conditioning apparatus according to the present invention includes: a compressor configured to compress and discharge a refrigerant; a radiator configured to release heat from the refrigerant; a heat exchanger configured to absorb the heat into the refrigerant; an outdoor heat exchanger configured to release the heat from or absorb the heat into the refrigerant; an outdoor radiator configured to further release the heat from the refrigerant having released the heat in the outdoor heat exchanger; a cooling/cooling and dehumidifying refrigerant circuit configured to allow the refrigerant discharged from the compressor to flow into the radiator, to allow the refrigerant having passed through the radiator to flow into the outdoor heat exchanger, to allow the refrigerant having passed through the outdoor heat exchanger to flow into the outdoor radiator, to allow the refrigerant having passed through the outdoor radiator to flow into the heat exchanger via an expansion valve and to allow the refrigerant having passed through the heat exchanger to be sucked into the compressor; and a heating refrigerant circuit configured to allow the refrigerant discharged from the compressor to flow into the radiator, to allow the refrigerant having passed through the radiator to flow into the outdoor heat exchanger via an expansion part, and to allow the refrigerant having passed through the outdoor heat exchanger to be sucked into the compressor.

By this means, the refrigerant having passed through the outdoor radiator flows into the radiator in the cooling/cooling and dehumidifying refrigerant circuit, meanwhile the refrigerant having passed through the outdoor heat exchanger is sucked into the compressor without passing through the outdoor radiator.

Effect of the Invention

According to the present invention, the refrigerant having passed through the heat exchanger is supercooled in the outdoor radiator, and therefore it is possible to improve the efficiency of the air conditioning operation. Moreover, the refrigerant not having passed through the heat exchanger is sucked into the compressor without passing through the supercooling radiator. Therefore, it is possible to reduce pressure loss, and consequently improve the efficiency of the air conditioning operation.

BRIEF DESCRIPTION OF DRAWINGS

FIG. 3A is a graph showing the relationship between a valve opening signal and an opening area of the expansion part of the first control valve;

FIG. 3B is a graph showing the relationship between a valve opening signal and an opening area of the condensing pressure regulating part of the first control valve;

FIG. 3C is a graph showing the relationship between a valve opening signal and an opening area of the combination of the expansion part and the condensing pressure regulating part of the first control valve;

FIG. 9 is a table showing the states of the control valve in each operation;

FIG. 10 is a flowchart showing a determination process for a second heating and dehumidifying operation;

FIG. 14 is a table showing the states of the control valve in each operation;

FIG. 16 is a table showing the states of the control valve in each operation;

FIG. 18 is a table showing the states of the control valve in each operation;

FIG. 23 shows the first control valve formed integrally with the check valve;

FIG. 29 is a table showing the states of the control valve in each operation;

FIG. 31 is a table showing the states of the control valve in each operation.

DESCRIPTION OF EMBODIMENTS

FIG. 1 to FIG. 12 show Embodiment 1 of the present invention.

Figure 1:
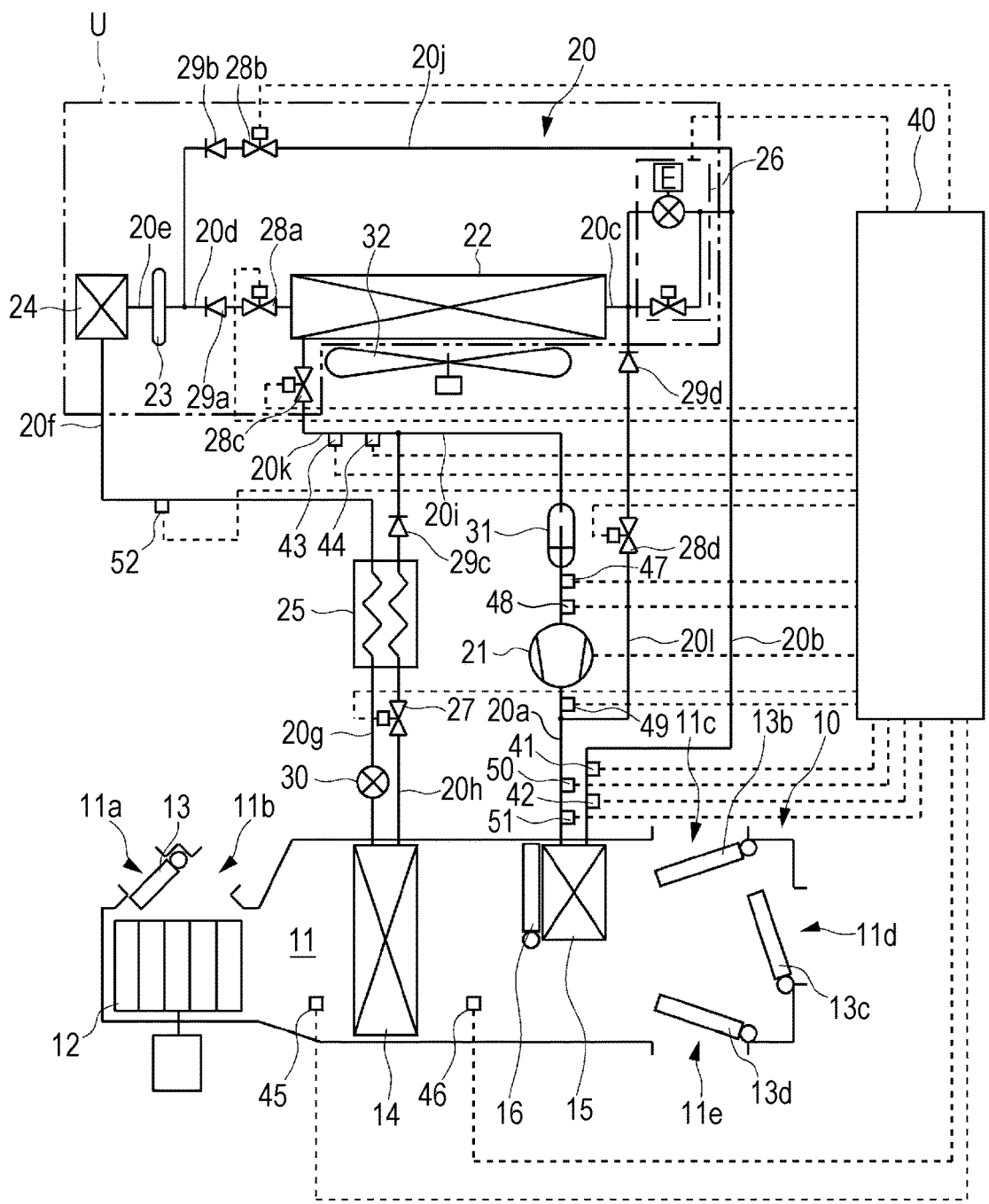
FIG. 1 is a schematic view showing a vehicle air conditioning apparatus according to Embodiment 1 of the present invention.

As shown in FIG. 1, the vehicle air conditioning apparatus according to the present invention includes an air conditioning unit 10 provided in the vehicle interior, and a refrigerant circuit 20 formed across the vehicle interior and the outdoor.

The air conditioning unit 10 includes an air flow passage 11 that allows the air to be supplied to the vehicle interior to pass through. An outdoor air inlet 11a and an indoor air inlet 11b are provided in the first end side of the air flow passage 11. The outdoor air inlet 11a is configured to allow the outdoor air to flow into the air flow passage 11, and the indoor air inlet 11b is configured to allow the indoor air to flow into the air flow passage 11. Meanwhile, a foot outlet 11c, a vent outlet 11d and a defroster outlet 11e are provided in the second end side of the air flow passage 11. The foot outlet 11c is configured to allow the air flowing through the air flow passage 11 to blow to the feet of the passengers in the vehicle. The vent outlet 11d is configured to allow the air flowing through the air flow passage 11 to blow to the upper bodies of the passengers in the vehicle. The defroster outlet 11e is configured to allow the air flowing through the air flow passage 11 to blow to the interior surface of the front window.

An indoor fan 12 such as a sirocco fan configured to allow the air to flow through the air flow passage 11 from end to end is provided in the first end side of the air flow passage 11.

Also, in the first end side of the air flow passage 11, an inlet switching damper 13 configured to open one of the outdoor air inlet 11a and the indoor air inlet 11b and to close the other. When the inlet switching damper 13 closes the indoor air inlet 11b and opens the outdoor air inlet 11a, the mode is switched to an outdoor air supply mode in which the air flows from the outdoor air inlet 11a into the air flow passage 11. Meanwhile, when the inlet switching damper 13 closes the outdoor air inlet 11a and opens the indoor air inlet 11b, the mode is switched to an indoor air circulation mode in which the air flows from the indoor air inlet 11b into the air flow passage 11. Moreover, when the inlet switching damper 13 is placed between the outdoor air inlet 11a and the indoor air inlet 11b and the outdoor air inlet 11a and the indoor air inlet 11b open, the mode is switched to a two-way mode in which the air flows from both the outdoor air inlet 11a and the indoor air inlet 11b into the air flow passage 11 according to the opening ratio of the outdoor air inlet 11a and the indoor air inlet 11b.

Outlet switching dampers 13b, 13c and 13d configured to open and close the foot outlet 11c, the vent outlet 11d and the defroster outlet 11e are provided in the foot outlet 11c, the vent outlet 11d and the defroster outlet 11e, respectively, in the second side of the air flow passage 11. These outlet switching dampers 13b, 13c and 13d are configured to move together by a linkage (not shown). Here, when the outlet switching dampers 13b, 13c and 13d open the foot outlet 1c, close the vent outlet 11d and slightly open the defroster outlet 11e, most of the air flowing through the air flow passage 11 blows out of the foot outlet 11c and the remaining air blows out of the defroster outlet 11e. This mode is referred to as "foot mode." Meanwhile, when the outlet switching dampers 13b, 13c and 13d close the foot outlet 11c and the defroster outlet 11e, and open the vent outlet 11d, all the air flowing through the air flow passage 11 blows out of the vent outlet 11d. This mode is referred to as "vent mode." In addition, when the outlet switching dampers 13b, 13c and 13d open the foot outlet 11c and the vent outlet 11d, and close the defroster outlet 11e, the air flowing through the air flow passage 11 blows out of the foot outlet 11c and the vent outlet 11d. This mode is referred to as "bi-level mode."

Moreover, when the outlet switching dampers 13b, 13c and 13d close the foot outlet 11c and the vent outlet 11d, and open the defroster outlet 11e, the air flowing through the air flow passage 11 blows out of the defroster outlet 11e. This mode is referred to as "defroster mode." Furthermore, when the outlet switching dampers 13b, 13c and 13d close the vent outlet 11d and open the foot outlet 11c and the defroster outlet 11e, the air flowing through the air flow passage 11 blows out of the foot outlet 11c and the defroster outlet 11e. This mode is referred to as "defroster-foot mode." Here, in the bi-level mode, the air flow passage 11, the foot outlet 11c, the vent outlet 11d, and a heat exchanger and a radiator which will be described later, are arranged and configured such that the temperature of the air blowing out of the foot outlet 11c is higher than the temperature of the air blowing out of the vent outlet 11d.

A heat exchanger 14 is provided in the air flow passage 11 in the downstream of the air flow from the indoor fan 12. The heat exchanger 14 is configured to cool and dehumidify the air flowing through the air flow passage 11. In addition, a radiator 15 is provided in the air flow passage 11 in the downstream of the air flow from the heat exchanger 14. The radiator 15 is configured to heat the air flowing through the air flow passage 11. The heat exchanger 14 and the radiator 15 are heat exchangers, each of which is constituted by fins and tubes and which is configured to perform a heat exchange between the refrigerant flowing therethrough and the air flowing through the air flow passage 11.

An air mix damper 16 is provided between the heat exchanger 14 and the radiator 15 in the air flow passage 11 and is configured to control the percentage of the air to be heated, which is flowing through the air flow passage 11. When the air mix damper 16 is disposed in the air flow passage 11 in the k of the radiator 15, the percentage of the air subjected to a heat exchange in the radiator 15 is reduced. Meanwhile, when the air mix damper 16 is moved to a position other than the radiator 15 in the air flow passage 11, the percentage of the air subjected to a heat exchange is increased. In the air flow passage 11, when the air mix damper 16 closes the upstream side of the radiator 15 and opens the portion other than the radiator 15, the opening is 0%, and, on the other hand, when the air mix damper 16 opens the upstream side of the radiator 15 and closes the portion other than the radiator 15, the opening is 100%.

The refrigerant circuit 20 includes: the heat exchanger 14; the radiator 15; a compressor 21 configured to compress a refrigerant; an outdoor heat exchanger 22 configured to perform a heat exchange between the refrigerant and the outdoor air; a receiver tank 23 configured to accumulate liquid refrigerant discharged from the outdoor heat exchanger; a supercooling radiator 24 as an outdoor radiator configured to supercool the liquid refrigerant discharged from the receiver tank 23; an internal heat exchanger 25 configured to perform a heat exchange between the refrigerant discharged from the supercooling radiator 24 and the refrigerant discharged from the heat exchanger 14; a first control valve 26 including an expansion part configured to decompress the refrigerant flowing into the outdoor heat exchanger 22 during the heating operation and the first heating and dehumidifying operation, and a condensing pressure regulating part configured to regulate the condensing pressure of the refrigerant in the radiator 15 during the cooling and dehumidifying operation; a second control valve 27 configured to regulate the evaporating pressure of the refrigerant in the heat exchanger 14; first to fourth solenoid valves 28a, 28b, 28c and 28d; first to fourth check valves 29a, 29b, 29c and 29d; an expansion valve 30; and an accumulator 31 configured to separate liquid refrigerant from refrigerant vapor to prevent the liquid refrigerant from being sucked into the compressor 21. These components are connected to each other by a copper pipe or an aluminum pipe.

To be more specific, input side of the radiator 15 into which the refrigerant flows is connected to the delivery side of the compressor 21 from which the refrigerant is discharged to form the refrigerant flow passage 20a. In addition, the input side of the first control valve 26 into which the refrigerant flows is connected to the output side of the radiator 15 from which the refrigerant is discharged, thereby to form the refrigerant flow passage 20b. A first connection port of the outdoor heat exchanger 22 is connected to the output side of the expansion part and the condensing pressure regulating part of the first control valve 26 from which the refrigerant is discharged, thereby to form the refrigerant flow passage 20c. The input side of the receiver tank 23 into which the refrigerant flows is connected to a second connection port of the outdoor heat exchanger 22, thereby to form the refrigerant flow passage 20d. In the refrigerant flow passage 20d, the first solenoid valve 28a and the first check valve 29a in the order from the outdoor heat exchanger 22 side. The input side of the supercooling radiator 24 into which the refrigerant flows is connected to the output side of the receiver tank 23 from which the refrigerant is discharged, thereby to form the refrigerant flow passage 20e. The input side of the internal heat exchanger 25 into which a high-pressure refrigerant flows is connected to the output side of the supercooling radiator 24 from which the refrigerant is discharged, thereby to form the refrigerant flow passage 20f. The input side of the heat exchanger 14 into which the refrigerant flows is connected to the output side of the internal heat exchanger 25 from which the high-pressure refrigerant is discharged, thereby to from the refrigerant flow passage 20g. The expansion valve 30 is provided in the refrigerant flow passage 20g. The input side of the internal heat exchanger 25 into which a low-pressure refrigerant flows is connected to the output side of the heat exchanger 14 from which the refrigerant is discharged, thereby to form the refrigerant flow passage 20h. The second control valve 27 is provided in the refrigerant flow passage 20h. The suction side of the compressor 21 into which the refrigerant is sucked is connected to the output side of the internal heat exchanger 25 from which the refrigerant is discharged, thereby to form the refrigerant flow passage 20i. The third check valve 29c and the accumulator 31 are provided in the refrigerant flow passage 20i in the order from the internal heat exchanger 25 side. The part of the refrigerant flow passage 20d between the first check valve 29a and the receiver tank 23 is connected to the refrigerant flow passage 20b, thereby to form the refrigerant flow passage 20j. The second solenoid valve 28b and the second check valve 29b are provided in the refrigerant flow passage 20j in the order from the refrigerant flow passage 20b side. The part of the refrigerant flow passage 20i between the third check valve 29c and the accumulator 31 is connected to a third connection port of the outdoor heat exchanger 22, thereby to form the refrigerant flow passage 20k. The third solenoid valve 28c is provided in the refrigerant flow passage 20k. The refrigerant flow passage 20c is connected to the refrigerant flow passage 20a, thereby to form the refrigerant flow passage 20l as a defrosting circuit. The fourth solenoid valve 28d and the fourth check valve 29d are provided in the refrigerant flow passage 20l in the order from the refrigerant flow passage 20a.

The compressor 21, the outdoor heat exchanger 22, the receiver tank 23 and the supercooling radiator 24 are disposed outside the vehicle interior. The outdoor heat exchanger 22 includes an outdoor fan 32 configured to perform a heat exchange between the outdoor air and the refrigerant while the vehicle stops.

Figure 2:
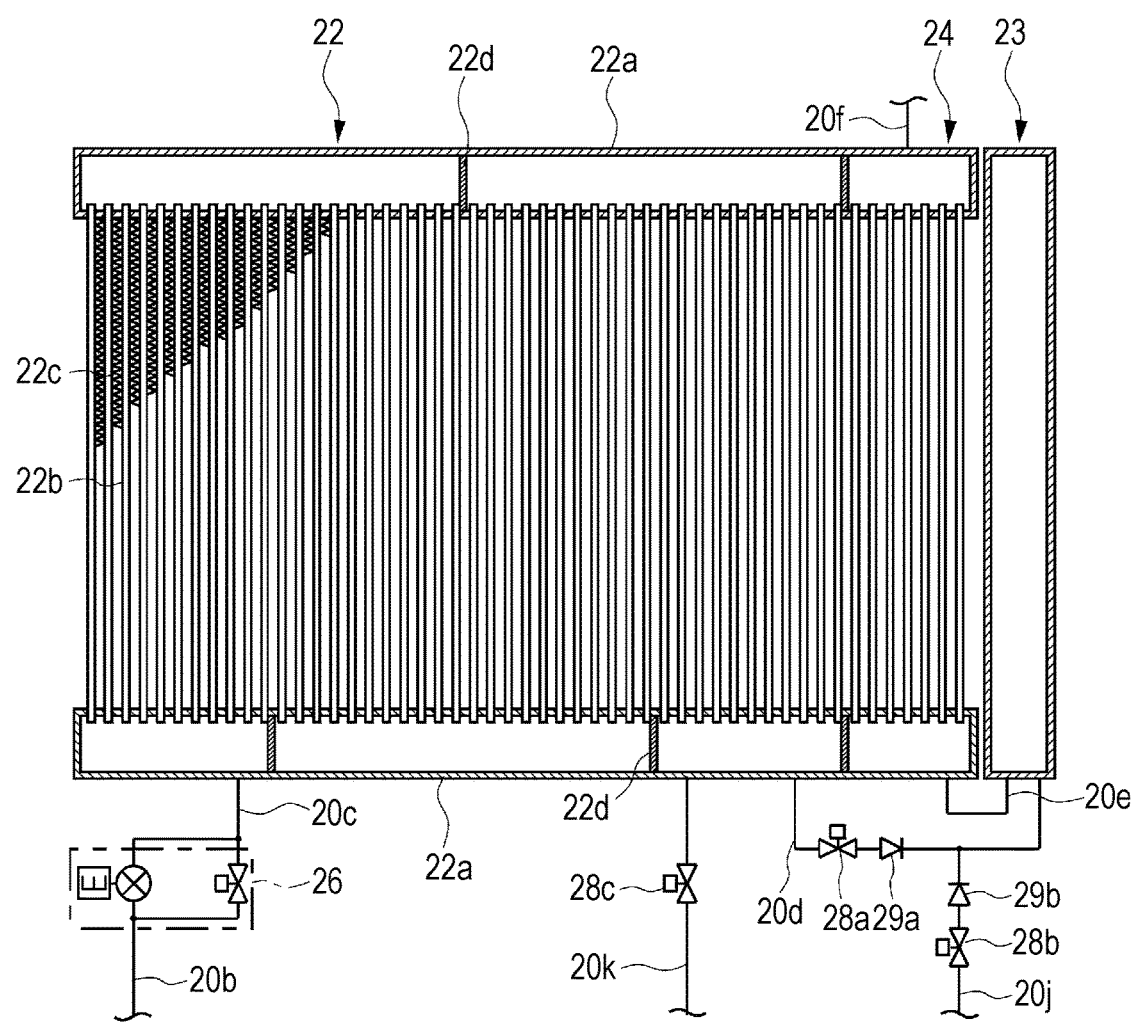
FIG. 2 shows an outdoor heat exchanger unit.

As shown in FIG. 2, the outdoor heat exchanger 22 is formed integrally with the receiver tank 23, the supercooling radiator 24, the first control valve 26, the first solenoid valve 28a, the second solenoid valve 28b, the third solenoid valve 28c, the first check valve 29a and the second check valve 29b to realize an outdoor heat exchanger unit U.

The outdoor heat exchanger 22 and the supercooling radiator 24 include: a pair of upper and lower headers 22a extending in the width direction; a plurality of flat tubes 22b provided apart from each other and connecting between the headers 22a; and wavy fins 22c provided between each of the flat tubes 22b. The outdoor heat exchanger 22 is provided in one side of the width direction of the pair of headers 22a meanwhile the supercooling radiator 24 is provided in the other side of the width direction of the pair of headers 22a.

Each of the header 22a is made of a cylindrical member having closed both ends. The inside of each of the headers 22a is partitioned in the width direction by a plurality of partition members 22d. By this means, a refrigerant flow path that extends in the width direction, zigzagging up and down, is formed in the outdoor heat exchanger 22. The refrigerant flow passage 20c is connected to the lower header 22a at a position in one space of the lower header 22a for the outdoor heat exchanger 22. The refrigerant flow passage 20d and the refrigerant flow passage 20k are connected to the lower header 22a at respective positions in another space for the outdoor heat exchanger 22. Moreover, the refrigerant flow passage 20e is connected to the lower header 22a at a position in the space for the supercooling radiator 24. Meanwhile, the refrigerant flow passage 20f is connected to the upper header 22a at a position in the space for the supercooling radiator 24.

The receiver tank 23 is made of a cylindrical member extending in the vertical direction and having closed both ends. The refrigerant flow passages 20d and 20e are connected to the lower end of the receiver tank 23. Surplus refrigerant in the refrigerant circuit 20 is accumulated in the receiver tank 23.

The internal heat exchanger 25 is, for example, a double-pipe heat exchanger, and is configured to allow the refrigerant flowing through the refrigerant flow passage 20f to flow into the inner pipe and to allow the refrigerant flowing through the refrigerant flow passage 20h to flow into the outer pipe, and therefore to perform a heat exchange between these refrigerants.

In the first control valve 26, the refrigerant flow channel to the expansion part and the refrigerant flow channel to the condensing pressure regulating part are provided for one refrigerant inlet. In addition, in the control valve 26, one refrigerant outlet is provided for both the refrigerant flow channel to the expansion part and the refrigerant flow channel to the condensing pressure regulating part. A valve element for regulating a valve opening is provided in each of the refrigerant flow channel to the expansion part and the refrigerant flow channel to the condensing pressure regulating part. The expansion part of the first control valve 26 has a function as an electronic expansion valve, and the condensing pressure regulating part has a function as a solenoid valve. The first control valve 26 can regulate the valve opening between when the valve opening of each of the expansion part and the condensing pressure regulating part is zero and when it is full. Also, as shown in FIG. 3, the first control valve 26 can regulate the opening area of the refrigerant flow channel between when the expansion part and the condensing pressure regulating part are completely closed and when they are fully open. FIG. 3 shows the relationship between a valve opening signal and an opening area, with the horizontal axis for the valve opening signal and the vertical axis for the opening size equivalent to the opening area of the refrigerant flow channel. FIG. 3A shows the relationship between the valve opening signal and the opening size equivalent to the opening area of the refrigerant flow channel in the expansion part side. FIG. 3B shows the relationship between the valve opening signal and the opening size equivalent to the opening area of the refrigerant flow channel in the condensing pressure regulating part side. FIG. 3C shows the relationship between the valve opening signal and the opening size equivalent to the opening area of the refrigerant flow channel in the combination of the expansion part side and the condensing pressure regulating part side.

The second control valve 27 is configured to allow its opening to be regulated step by step or optionally. The second control valve 27 is configured to regulate an amount of the refrigerant flowing through the refrigerant flow passage 20h by regulating the valve opening, and consequently to regulate the evaporating pressure of the refrigerant in the heat exchanger 14.

The expansion valve 30 is a temperature expansion valve having the adjustable opening according to the temperature of the refrigerant discharged from the heat exchanger 14. As a temperature expansion valve, for example, a box type temperature valve including a refrigerant outlet channel that allows the refrigerant flowing out of the heat exchanger to flow through, a temperature-sensitive rod that detects the temperature of the refrigerant flowing out of the refrigerant outlet channel, and a diaphragm to move the valve element, which are integrally formed.

As shown in FIG. 1, the vehicle air conditioning apparatus further includes a controller 40 configured to control the number of rotations of the compressor 21, the valve opening of the first control valve 26, the valve opening of the second control valve 27, and the opening and closing of each of the first to fourth solenoid valves 28a, 28b, 28c and 28d.

The compressor 21, the first control valve 26, the second control valve 27, and the first to fourth solenoid valves 28a, 28b, 28c and 28d are connected to the output side of the controller 40. Meanwhile, a high-pressure refrigerant temperature sensor 41 configured to detect temperature Thp1 of a high-pressure refrigerant flowing through the refrigerant flow passage 20b; a high-pressure refrigerant pressure sensor 42 configured to detect pressure Php1 of the high-pressure refrigerant flowing through the refrigerant flow passage 20b; a low-pressure refrigerant temperature sensor 43 configured to detect temperature Thp2 of a low-pressure refrigerant flowing through the refrigerant flow passage 20k; a low-pressure refrigerant pressure sensor 44 configured to detect pressure Php2 of the low-pressure refrigerant flowing through the refrigerant flow passage 20k; an intake air temperature sensor 45 configured to detect temperature T of air flowing through the air flow passage 11 upstream from the heat exchanger 14; a cooled air temperature sensor 46 configured to detect temperature Tc flowing downstream from the heat exchanger 14; a sucked refrigerant temperature sensor 47 configured to detect the temperature of the refrigerant flowing through the refrigerant flow passage 20i that is sucked into the compressor 21; a sucked refrigerant pressure sensor 48 configured to detect the pressure of the refrigerant flowing through the refrigerant flow passage 20i that is sucked into the compressor 21; a discharged refrigerant pressure sensor 49 configured to detect the pressure of the refrigerant flowing through the refrigerant flow passage 20a that is discharged from the compressor 21; an input refrigerant temperature sensor 50 configured to detect the temperature of the refrigerant flowing through the refrigerant flow passage 20a that flows into the radiator 15; and an input refrigerant pressure sensor 51 configured to detect the pressure of the refrigerant flowing through the refrigerant flow passage 20a that flows into the radiator 15; and a pressure sensor 52 configured to detect the pressure of the refrigerant flowing through the refrigerant flow passage 20f, are connected to the input side of the controller 40. Here, the high-pressure refrigerant temperature sensor 41 and the high-pressure refrigerant pressure sensor 42 do not necessarily need to be separated, but may be integrally formed. Also, the sucked refrigerant temperature sensor 47 and the sucked refrigerant pressure sensor 48 do not necessarily need to be separated, but may be integrally formed. Moreover, the input refrigerant temperature sensor 50 and the input refrigerant pressure sensor 51 do not necessarily need to be separated, but may be integrally formed.

The vehicle air conditioning apparatus having the above-described configuration performs cooling operation, cooling and dehumidifying operation, heating operation, first heating and dehumidifying operation as heating and dehumidifying operation, second heating and dehumidifying operation as internal heating and dehumidifying operation, and first defrosting operation. Now, each operation will be explained.

Figure 4:
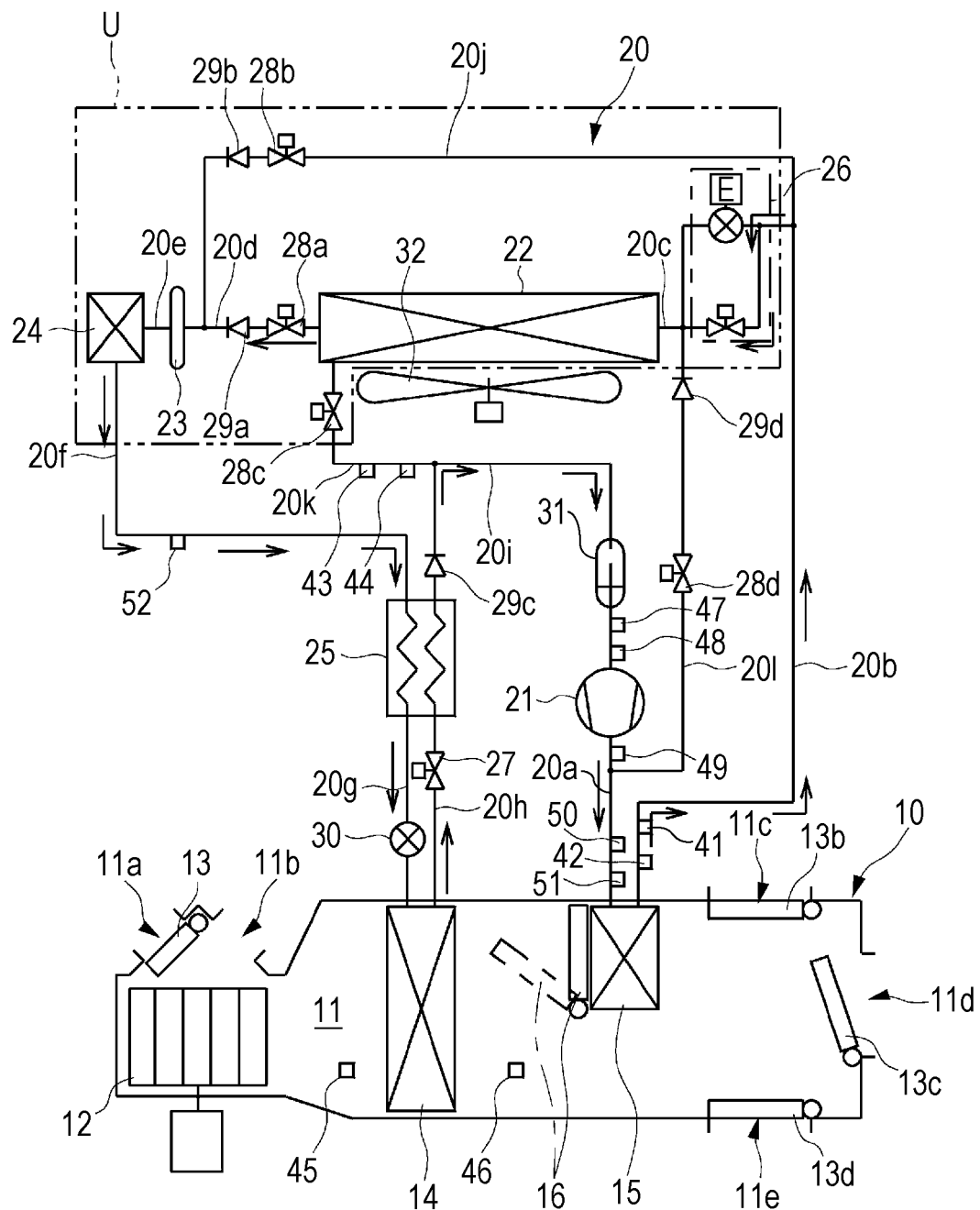
FIG. 4 is a schematic view showing the vehicle air conditioning apparatus performing a cooling operation and a cooling and dehumidifying operation.

During the cooling operation and the cooling and dehumidifying operation, in the refrigerant circuit 20, the refrigerant flow channel to the expansion part is closed while the refrigerant flow channel to the condensing pressure regulating part is opened in the first control valve 26; the first solenoid valve 28a is opened; the second, third and fourth solenoid valves 28b, 28c and 28d are closed; and compressor 21 is operated. By this means, as shown in FIG. 4, the refrigerant discharged from the compressor 21 flows through in this order: the refrigerant flow passage 20a; the radiator 15; the refrigerant flow passage 20b; the condensing pressure regulating part of the first control valve 26; the refrigerant flow passage 20c; the outdoor heat exchanger 22; refrigerant flow passage 20d; the receiver tank 23; the refrigerant flow passage 20e; the supercooling radiator 24; the refrigerant flow passage 20f; the high-pressure side of the internal heat exchanger 25; the refrigerant flow passage 20g; the heat exchanger 14; the refrigerant flow passage 20h; the low-pressure side of the internal heat exchanger 25; and the refrigerant flow passage 20i, and is sucked into the compressor 21. During the cooling operation, the refrigerant flowing through the refrigerant circuit 20 releases the heat in the outdoor heat exchanger 22 and absorbs the heat in the heat exchanger 14. During the cooling and dehumidifying operation, when the air mix damper 16 is opened as shown by the dashed-dotted line of FIG. 4, the refrigerant flowing through the refrigerant circuit 20 releases the heat also in the radiator 15.

In this case, in the air conditioning unit 10 during the cooling operation, the indoor fan 12 is operated to flow the air through the air flow passage 11, and the air is subjected to a heat exchange with the refrigerant in the heat exchanger 14 and cooled. The temperature of the cooling air becomes target air-blowing temperature TAO of the air to blow out of the outlets 11c, 11d and 11e to the vehicle interior in order to set the temperature of the vehicle interior to the target preset temperature Tset.

The target air-blowing temperature TAO is calculated based on the preset temperature Tset, and environmental conditions including the outdoor air temperature Tam, the indoor air temperature Tr, and an amount of insolation Ts.

Meanwhile, in the air conditioning unit 10 during the cooling and dehumidifying operation, the indoor fan 12 is operated to flow the air through the air flow passage 11, and the air is subjected to a heat exchange with the refrigerant which absorbs the heat in the heat exchanger 14, and therefore is cooled and dehumidified. The air having been dehumidified in the heat exchanger 14 is subjected to a heat exchange with the refrigerant which releases the heat in the radiator 15, and therefore heated. As a result, the air at the target air-blowing temperature TAO blows to the vehicle interior.

During the cooling and dehumidifying operation, the opening of the condensing pressure regulating part of the first control valve 26 is adjusted to regulate the condensing pressure of the refrigerant in the radiator 15. That is, it is possible to control the quantity of heat release in the radiator 15 by regulating the condensing pressure of the refrigerant in the radiator 15. To be more specific, the condensing pressure of the refrigerant in the radiator 15 is decreased by increasing the opening of the condensing pressure regulating part of the first control valve 26, and, on the other hand, is increased by decreasing the opening. By this means, the quantity of heat release in the radiator 15 is decreased by decreasing the condensing pressure but is increased by increasing the condensing pressure.

During the cooling operation and the cooling and dehumidifying operation, the refrigerant having passed through the outdoor heat exchanger 22 flows into the supercooling radiator 24 via the receiver tank 23. Therefore, the liquid refrigerant flowing into the supercooling radiator 24 is subjected to a heat exchange with the outdoor air and becomes in a supercooling state.

Figure 5:
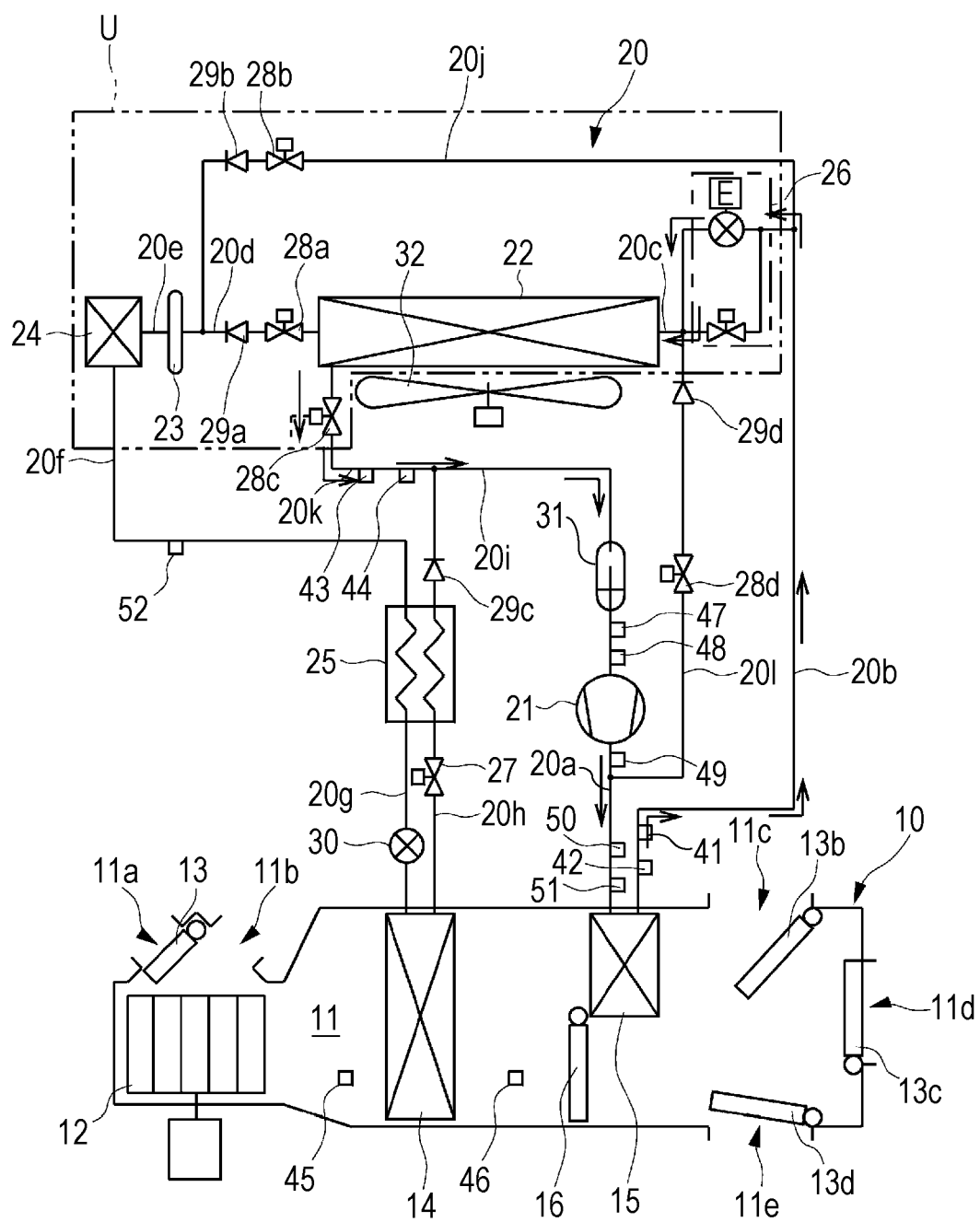
FIG. 5 is a schematic view showing the vehicle air conditioning apparatus performing a heating operation.

During the heating operation, in the refrigerant circuit 20, the refrigerant flow channel to the expansion part is opened while the refrigerant flow channel to the condensing pressure regulating part is closed in the first control valve 26; the third solenoid valve 28c is opened; the first, second, and fourth solenoid valves 28a, 28b and 28d are closed; and the compressor 21 is operated. By this means, as shown in FIG. 5, the refrigerant discharged from the compressor 21 flows through in this order: the refrigerant flow passage 20a; the radiator 15; the refrigerant flow passages 20b; the expansion part of the first control valve 26; the refrigerant flow passages 20c; the outdoor heat exchanger 22; and the refrigerant flow passages 22k and 20i, and is sucked into the compressor 21. The refrigerant flowing through the refrigerant circuit 20 releases the heat in the radiator 15 and absorbs the heat in the outdoor heat exchanger 22.

In this case, in the air conditioning unit 10, the indoor fan 12 is operated to flow the air through the air flow passage 11, and the flowing air is not subjected to a heat exchange with the refrigerant in the heat exchanger 14, but is subjected to a heat exchange with the refrigerant in the radiator 15 and therefore is heated. As a result, the air at the target air-blowing temperature TAO blows to the vehicle interior.

Figure 6:
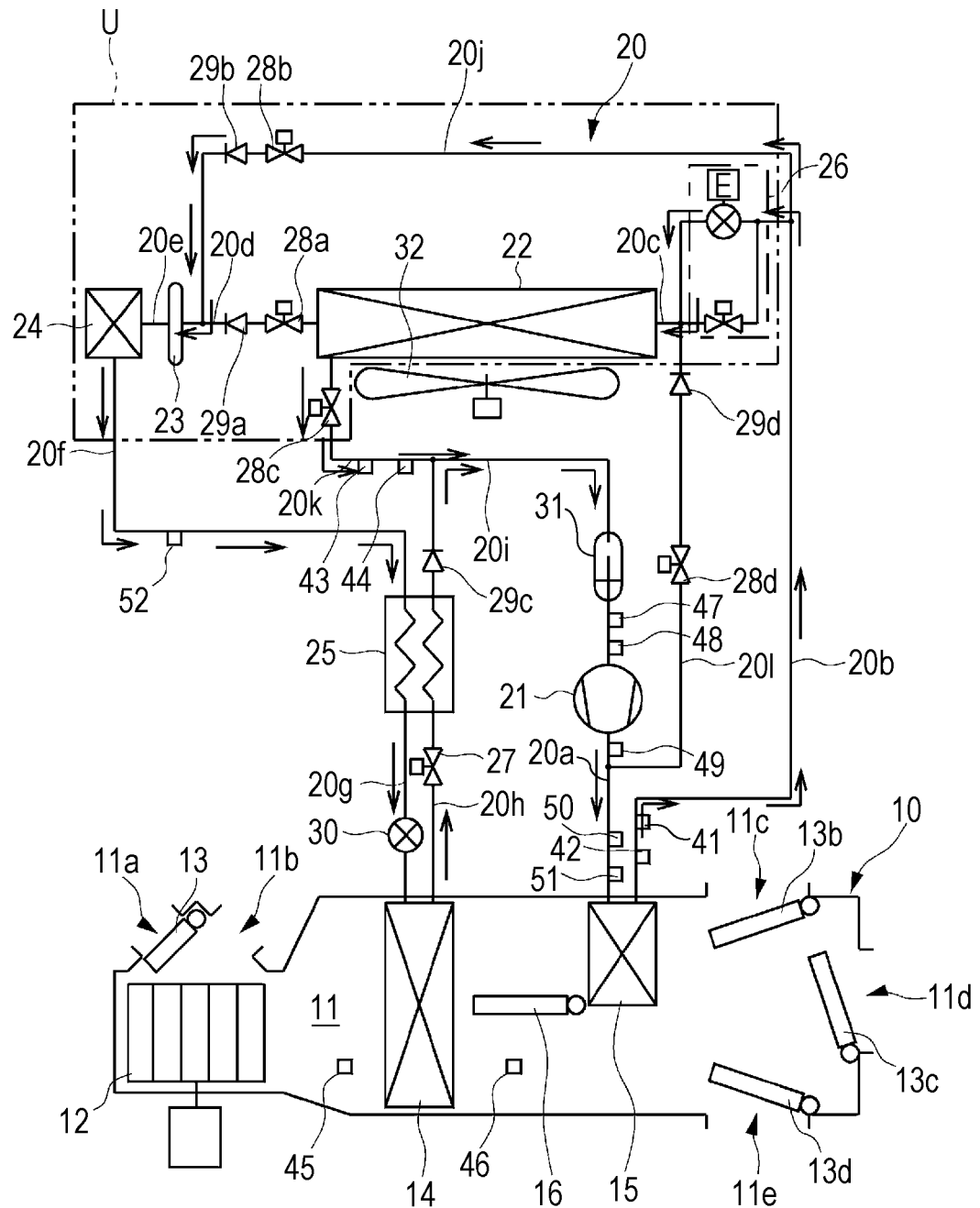
FIG. 6 is a schematic view showing the vehicle air conditioning apparatus performing a first heating and dehumidifying operation.

During the first heating and dehumidifying operation, in the refrigerant circuit 20, the refrigerant flow channel to the expansion part is opened while the refrigerant flow channel to the condensing pressure regulating part is closed in the first control valve 26; the second and third solenoid valves 28b and 28c are opened; the first and fourth solenoid valves 28a and 28d are closed; and the compressor 21 is operated. By this means, as shown in FIG. 6, the refrigerant discharged from the compressor 21 flows through in this order: the refrigerant flow passage 20a; the radiator 15; and the refrigerant flow passage 20b. Part of the refrigerant flowing through the refrigerant flow passage 20b flows through in this order: the expansion part of the first control valve 26; the refrigerant flow passage 20c; the outdoor heat exchanger 22; and the refrigerant flow passages 20k and 20i, and is sucked into the compressor 21. Meanwhile, the remaining refrigerant flowing through the refrigerant flow passage 20b flows through in this order: the refrigerant flow passages 20j and 20d; the receiver tank 23; the refrigerant flow passage 20e; the supercooling radiator 24, the refrigerant flow passage 20f; the high-pressure side of the internal heat exchanger 25; the refrigerant flow passage 20g; the heat exchanger 14; the refrigerant flow passage 20h; the low-pressure side of the internal heat exchanger 25; and the refrigerant flow passage 20i, and is sucked into the compressor 21. The refrigerant flowing through the refrigerant circuit 20 releases the heat in the radiator 15 and absorbs the heat in the heat exchanger 14 and the outdoor heat exchanger 22.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified. Part of the air having been dehumidified in the heat exchanger 14 is subjected to a heat exchange with the refrigerant in the radiator 15 and heated. As a result, the air at the target air-blowing temperature TAO blows into the vehicle interior.

In addition, the evaporating temperature of the refrigerant in the heat exchanger 14 is controlled by regulating the opening of the second control valve 27. That is, when the opening of the second control valve 27 is decreased, the evaporating temperature of the refrigerant in the heat exchanger 14 increases. On the other hand, when the opening of the second control valve 27 is increased, the evaporating temperature decreases.

Figure 7:
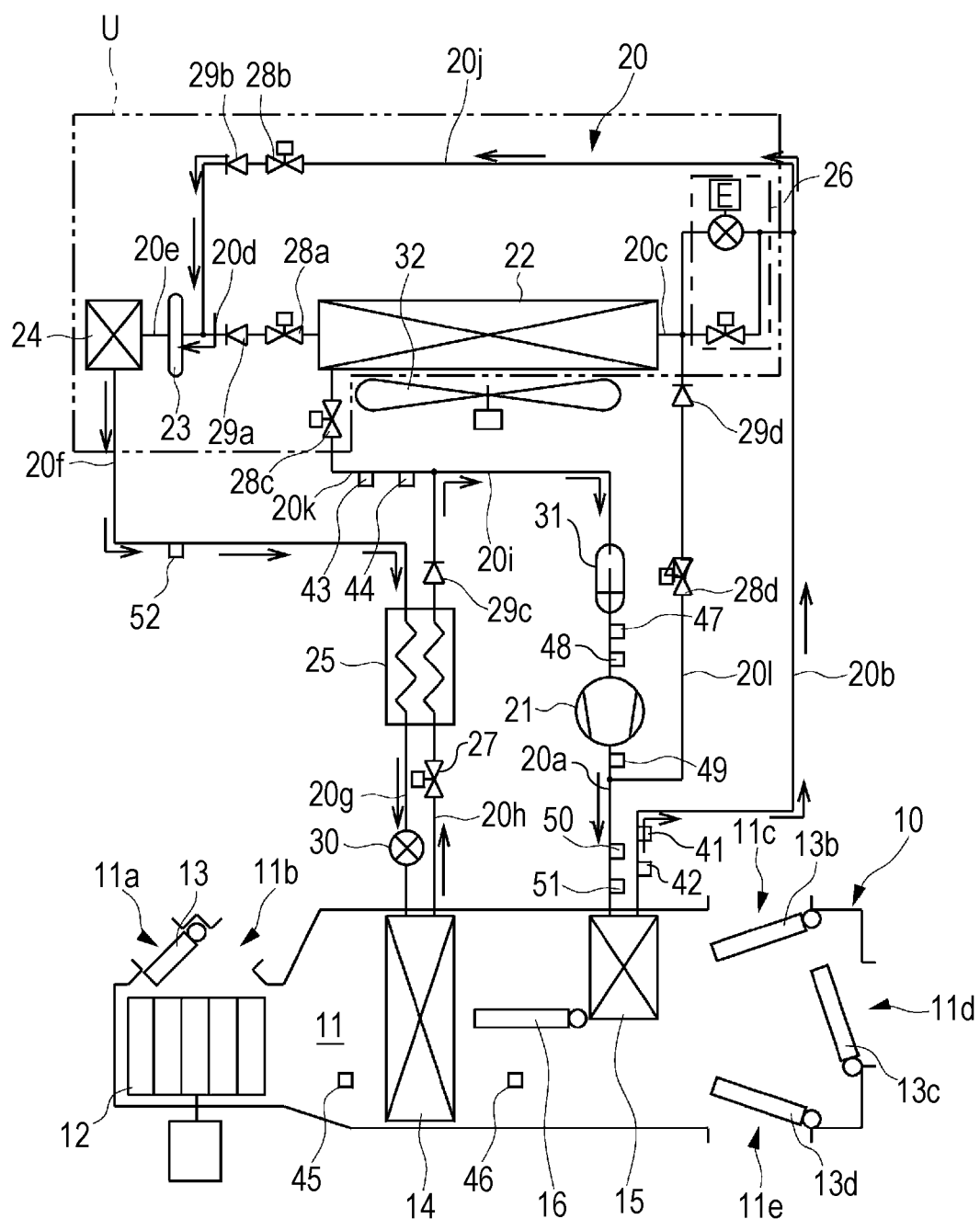
FIG. 7 is a schematic view showing the vehicle air conditioning apparatus performing a second heating and dehumidifying operation.

During the second heating and dehumidifying operation, in the refrigerant circuit 20, both the refrigerant flow channel to the expansion part and the refrigerant flow channel to the condensing pressure regulating part are closed in the first control valve 26; the second solenoid valve 28b is opened; the first, third and fourth solenoid valves 28a, 28c and 28d are closed; and the compressor 21 is operated. By this means, as shown in FIG. 7, the refrigerant discharged from the compressor 21 flows through in this order: the refrigerant flow passage 20a; the radiator 15; the refrigerant flow passages 20b, 20j and 20d; the receiver tank 23; the refrigerant flow passages 20e; the supercooling radiator 24; the refrigerant flow passages 20f; the high-pressure side of the internal heat exchanger 25; the refrigerant flow passages 20g; the heat exchanger 14; the refrigerant flow passages 20h; the low-pressure side of the internal heat exchanger 25; and the refrigerant flow passages 20i, and is sucked into the compressor 21. The refrigerant flowing through the refrigerant circuit 20 releases the heat in the radiator 15 and absorbs the heat in the heat exchanger 14.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified in the same way as in the first heating and dehumidifying operation. Part of the air dehumidified in the heat exchanger 14 is subjected to a heat exchange with the refrigerant in the radiator 15, and therefore heated. As a result, the air at the target air-blowing temperature TAO blows to the vehicle interior. Here, the air flowing into the air flow passage 11 may be the outdoor air or the indoor air.

Figure 8:
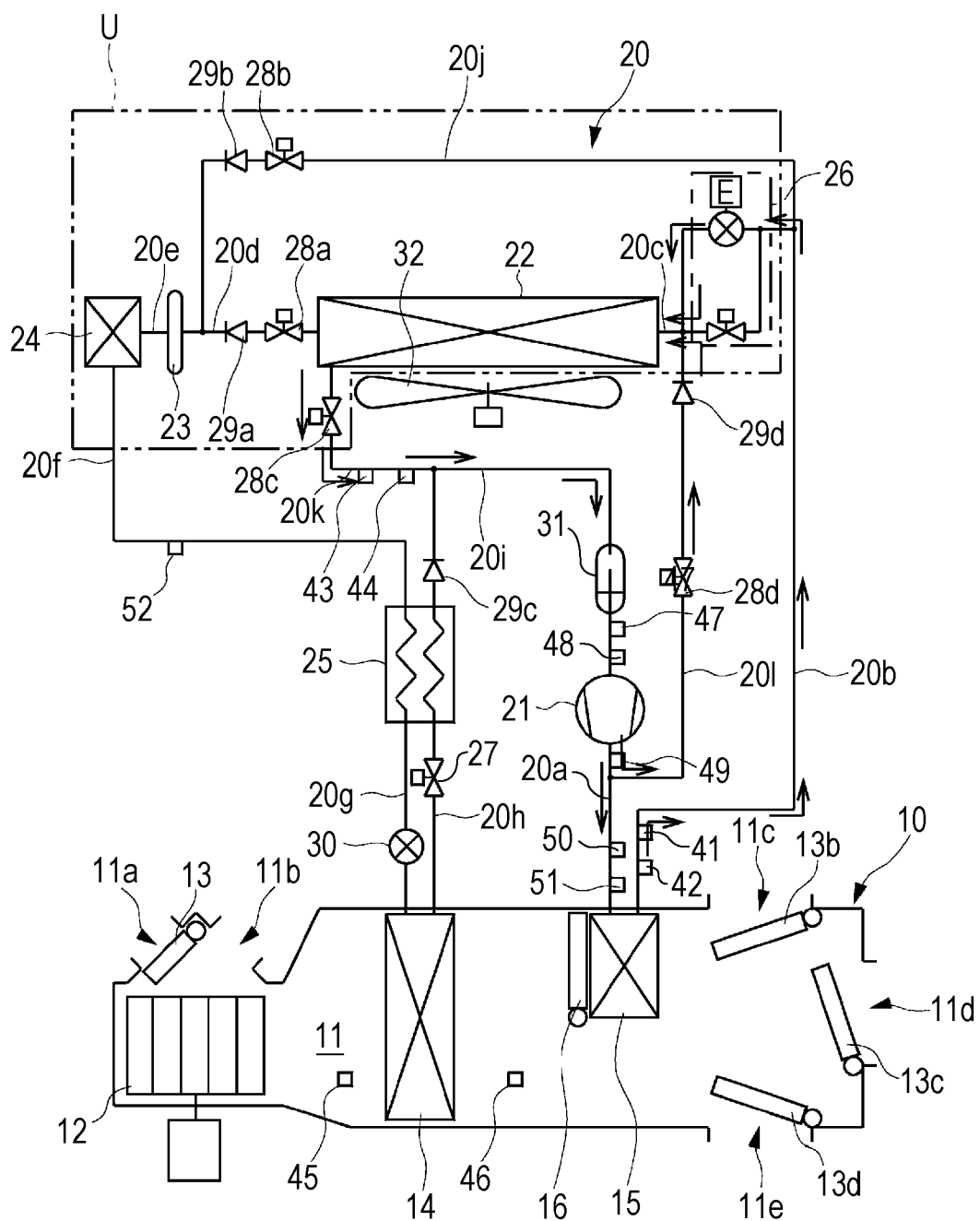
FIG. 8 is a schematic view showing the vehicle air conditioning apparatus performing a defrosting operation.
Figure 11:
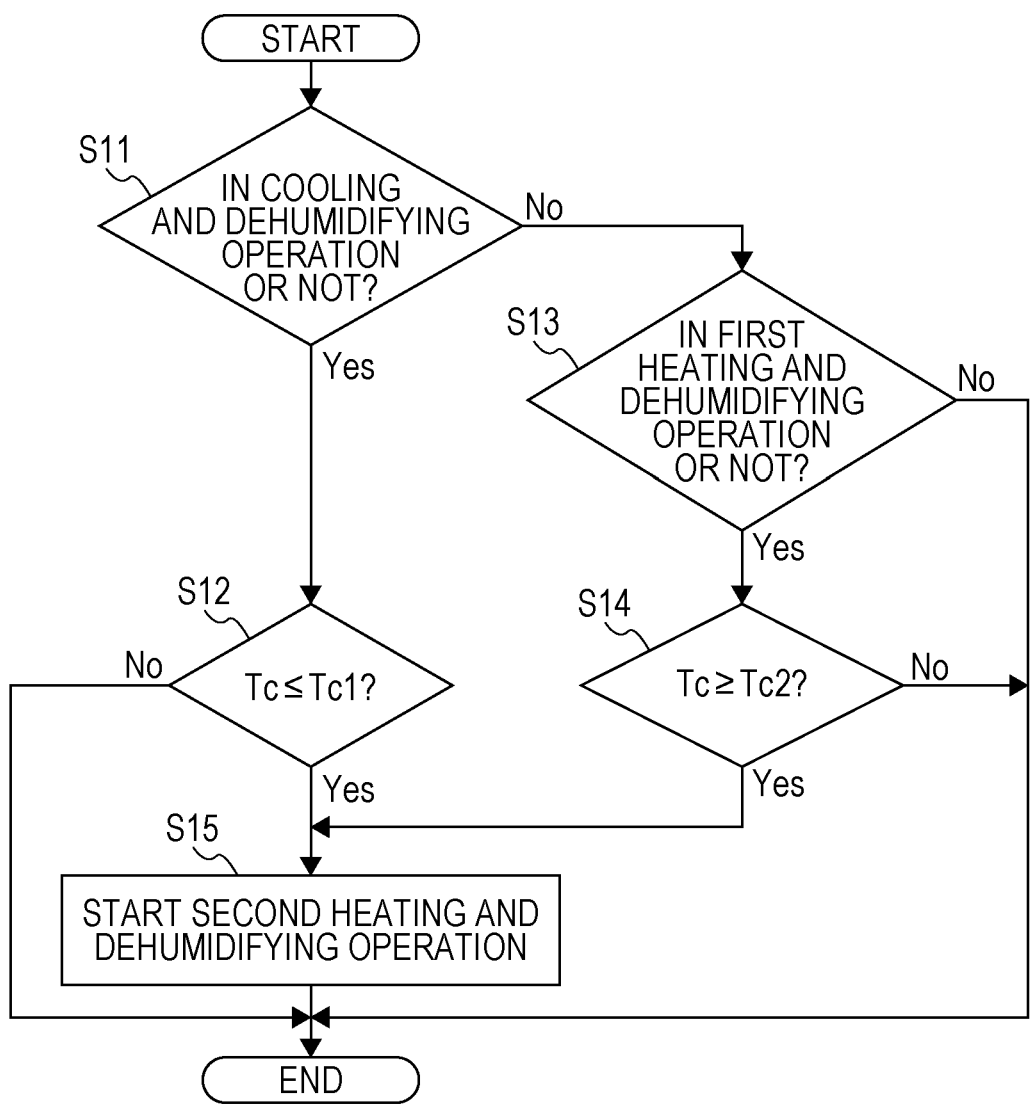
FIG. 11 is a flowchart showing a process for switching to a second heating and dehumidifying operation.
Figure 12:
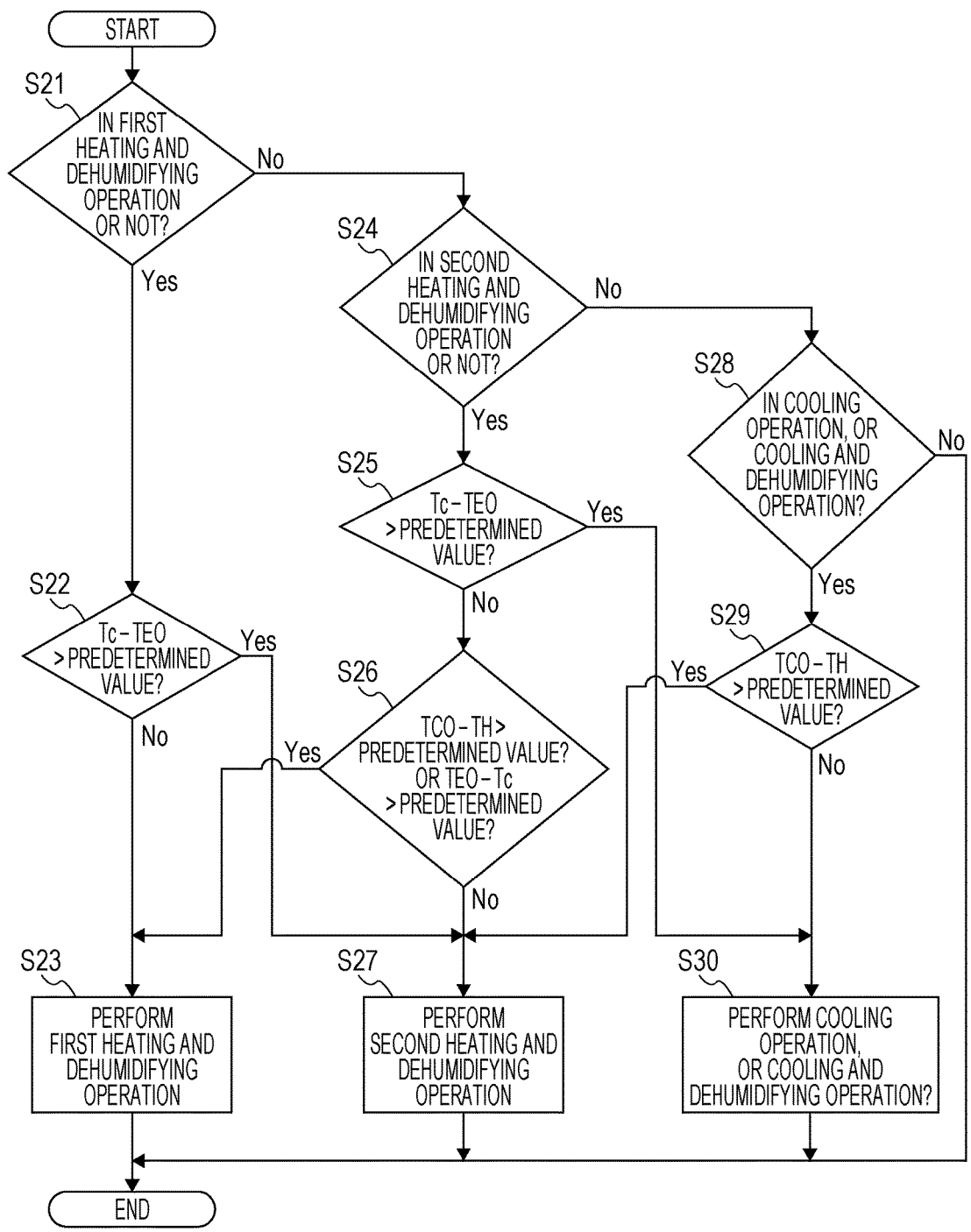
FIG. 12 is a flowchart showing a process for controlling operation switching.

During the defrosting operation, in the refrigerant circuit 20, the refrigerant flow channel to the expansion part is opened while the refrigerant flow channel to the condensing pressure regulating part is closed in the first control valve 26; the third and fourth solenoid valves 28c and 28d are opened while the first and second solenoid valves 28a and 28b are closed; and the compressor 21 is operated. By this means, as shown in FIG. 8, part of the refrigerant discharged from the compressor 21 flows through in this order: the refrigerant flow passage 20a; the radiator 15; the refrigerant flow passage 20b; the expansion part of the first control valve 26; and the refrigerant flow passage 20c, and is sucked into the compressor 21. Meanwhile, the remaining refrigerant discharged from the compressor 21 flows through the refrigerant flow passages 20l and 20c, and flows into the outdoor heat exchanger 22. The refrigerant discharged from the outdoor heat exchanger 22 flows through the refrigerant flow passages 20k and 20i, and is sucked into the compressor 21. The refrigerant flowing through the refrigerant circuit 20 releases the heat in the radiator 15, and at this time, absorbs the heat in the outdoor heat exchanger 22.

In this case, in the air conditioning unit 10, the indoor fan 12 is operated to flow the air through the air flow passage 11. The flowing air is not subjected to a heat exchange with the refrigerant in the heat exchanger 14, but is subjected to a heat exchange with the refrigerant which releases the heat in the radiator 15, and therefore is heated and then blows to the vehicle interior.

In the above-described air conditioning operations, the opening and closing of each of the first control valve 26, the second control valve 27, and the first to fourth solenoid valves is switched as shown in the table of FIG. 9.

While an automatic switch is turned on, the operation is switched among the cooling operation, the cooling and dehumidifying operation, the heating operation, the first heating and dehumidifying operation, the second heating and dehumidifying operation and the defrosting operation, based on environmental conditions including the outdoor air temperature Tam, the indoor air temperature Tr, the outdoor air humidity, the indoor air humidity Th, the amount of insolation Ts and so forth.

In addition, the mode of the outlets 11c, 11d and 11e are switched by the outlet switching dampers 13b, 13c and 13d. The opening of the air mix damper 16 is controlled such that the temperature of the air blowing out of the outlets 11c, 11d and 11e is the target air-blowing temperature TAO.

In each operation, switching the operation among the foot mode, the vent mode and the bi-level mode of each of the outlets 11c, 11d and 11e is performed according to the target air-blowing temperature TAO. To be more specific, when the target air-blowing temperature TAO is high, for example, 40 degrees Celsius, the mode is set to the foot mode. Meanwhile, when the target air-blowing temperature TAO is low, for example, lower than 25 degrees Celsius, the mode is set to the vent mode. Moreover, when the target air-blowing temperature TAO is the temperature between the temperature for the foot mode and the temperature for the vent mode, the mode is set to the bi-level mode.

When each of the outlets 11c, 11d and 11e is set to the bi-level mode, the controller performs a determination process for second heating and dehumidifying operation to determine whether or not to perform the second heating and dehumidifying operation. Now, the operation of the controller 40 in this process will be explained with reference to the flowchart of FIG. 10.

(Step 1)

In step 1, the CPU determines whether or not each of the outlets 11c, 11d and 11e is set to the bi-level mode. When determining that the outlets are set to the bi-level mode, the CPU moves the step to step S2. On the other hand, when determining that the outlets are not set to the bi-level mode, the CPU ends the determination process for second heating and dehumidifying operation.

(Step S2)

In the case of determining that the bi-level mode is set in the step S1, the CPU determines whether or not temperature T detected by the intake air temperature sensor 45 is first predetermined temperature T1 (e.g. 10 to 15 degrees Celsius) or higher in the step S2. When determining that the temperature T detected by the intake air temperature sensor 45 is the first predetermined temperature T1 or higher, the CPU moves the step to step S3. On the other hand, when determining that the temperature T detected by the intake air temperature 45 is lower than the first predetermined temperature T1, the CPU moves the step to step S5.

(Step S3)

In the case of determining that the temperature T detected by the intake air temperature sensor 45 is the first predetermined temperature T1 or higher in the step 2, the CPU determines whether or not the temperature T detected by the intake air temperature sensor 45 is second predetermined temperature T2 (e.g. 20 to 25 degrees Celsius) or higher in the step S3. When determining that the temperature detected by the intake air temperature sensor 45 is the second predetermined temperature T2 or higher, the CPU moves the step to the step S5. On the other hand, when determining that the temperature T detected by the intake air temperature sensor 45 is lower than the second predetermined temperature (T1<T<T2), the CPU moves the step to step S4.

(Step S4)

In the case of determining that the temperature detected by the intake air temperature sensor 45 is lower than the second predetermined temperature T2 in the step S3, the CPU starts the second heating and dehumidifying operation and ends the determination process for second heating and dehumidifying operation in the step S4.

(Step S5)

In the case of determining that the temperature T detected by the intake air temperature sensor 45 is lower than the first predetermined temperature in the step S2, or in the case of determining that the temperature T is the second predetermined temperature T2 or higher in the step S3, the CPU ends the second heating and dehumidifying operation in the step 5, and ends the determination process for second heating and dehumidifying operation.

whether or not to perform the second heating and dehumidifying operation may be determined not only based on the temperature T of the air flowing upstream the heat exchanger 14, but also the temperature of the outdoor air.

In addition, during the cooling and dehumidifying operation, or the first heating and dehumidifying operation, when each of the outlets 11c, 11d and 11e is set to the bi-level mode, a process for switching to second heating and dehumidifying operation is performed to switch the operation to the second heating and dehumidifying operation, based on the temperature of the air after a heat exchange with the refrigerant in the heat exchanger 14. Now, the operation of the controller 40 in this process will be explained with reference to the flowchart of FIG. 11.

(Step S11)

In step S11, the CPU determines whether or not the cooling and dehumidifying operation is being performed.

When determining that the cooling and dehumidifying operation is being performed, the CPU moves the step to step 12. On the other hand, when determining that the heating and dehumidifying operation is not being performed, the CPU moves the step to step S13.

(Step S12)

In the case of determining that the cooling and dehumidifying operation is being performed in the step S11, the CPU determines whether or not temperature Tc detected by the cooled air temperature sensor 46 is a third predetermined temperature Tc1 or lower in the step 12. When determining that the temperature Tc detected by the cooled air temperature sensor 46 is the third predetermined temperature Tc1 or lower, the CPU moves the step to step 15. On the other hand, determining that the temperature Tc is higher than the third predetermined temperature Tc1, the CPU ends the process for switching to second heating and dehumidifying operation.

(Step 13)

In the case of determining that the cooling and dehumidifying operation is not being performed in the step S11, the CPU determines whether or not the first heating and dehumidifying operation is being performed. When determining that the first heating and dehumidifying operation is being performed, the CPU moves the step to step S14. On the other hand, when determining that the first heating and dehumidifying operation is not being performed, the CPU ends the process for switching to second heating and dehumidifying operation.

(Step 14)

In the case of determining that the first heating and dehumidifying operation is being performed in the step S13, the CPU determines whether or not the temperature Tc detected by the cooled air temperature sensor 46 is a fourth predetermined temperature Tc2 or higher. When determining that the temperature Tc detected by the cooled air temperature sensor 36 is the fourth predetermined temperature Tc2 or higher, the CPU moves the step to step S15. On the other hand, when determining that the temperature is lower than the fourth predetermined temperature Tc2, the CPU ends the process for switching to second heating and dehumidifying operation.

(Step S15)

In the case of determining that the temperature Tc detected by the cooled air temperature sensor 46 is the third predetermined temperature Tc1 or lower in the step S12, or in the case of determining that the temperature Tc detected by the cooled air temperature sensor 46 is the fourth predetermined temperature Tc2 or higher in the step S14, the CPU switches the operation to the second heating and dehumidifying operation in the step S15, and ends the process for switching to second heating and dehumidifying operation.

The operation may be switched to the second heating and dehumidifying operation not only based on the temperature Tc of the air flowing downstream from the heat exchanger 14, but also based on a predicted value of the air flowing downstream from the radiator 15.

In addition, during the second heating and dehumidifying operation, the temperature of the air flowing downstream from the radiator 15 is regulated by controlling the number of rotations of the compressor 21. Moreover, during the second heating and dehumidifying operation, since the outlets 11c, 11c and 11e are set to the bi-level mode, the temperature of the air supplied to the vehicle interior is controlled to be the target air-blowing temperature TAO, by adjusting the opening of the air mix damper 16 within a predetermined range. In this case, the number of rotations of the compressor 21 is controlled, based on any of, or a combination of any of: the pressure of the high-pressure side of the refrigerant circuit 20; the temperature of the high-pressure side of the refrigerant circuit 20; the temperature of the air flowing through the air flow passage 11; and the temperature of the air flowing downstream from the heat exchanger 14.

In addition, regardless of whether or not the outlets 11c, 11d and 11e are set to the bi-level mode, the controller 40 performs an process for controlling operation switching to switch the operation among the first heating and dehumidifying operation, the second heating and dehumidifying operation and the cooling operation or the cooling and dehumidifying operation. Now, the operation of the controller 40 in this process will be explained with reference to the flowchart of FIG. 12.

(Step S21)

In step S21, the CPU determines whether or not the first heating and dehumidifying operation is being performed. When determining that the first heating and dehumidifying operation is being performed, the CPU moves the step to step S22. On the other hand, when determining that the first heating and dehumidifying operation is not being performed, the CPU moves the step to step S24.

(Step S22)

In the case of determining that the first heating and dehumidifying operation is being performed in the step S21, the CPU determines whether or not the difference (Tc−TEO) between the temperature Tc detected by the cooled air temperature sensor 46 and the target temperature TEO of the air flowing downstream from the heat exchanger 14 is greater than a predetermined value. When determining that the difference (Tc−TEO) is greater than the predetermined value, the CPU moves the step to step S27. On the other hand, when determining that the difference is the predetermined value or smaller, the CPU moves the step to step S23.

(Step S23)

In the case of determining that the difference (Tc−TEO) between the detected temperature Tc and the target temperature TEO is the predetermined value or smaller in the step S22; or, in step 26 described later, when determining that the difference (TCO−TH) between target temperature TCO of the air flowing downstream from the radiator 15 and estimated temperature TH of the air flowing downstream from the radiator 15 is greater than a predetermined value, or determining that the difference (TEO−Tc) between the target temperature TEO of the air flowing downstream from the heat exchanger 14 and the temperature Tc detected by the cooled air temperature sensor 46 is greater than the predetermined value, the CPU performs the first heating and dehumidifying operation in the step S23, and ends the process for controlling operation switching.

(Step S24)

In the case of determining that the first heating and dehumidifying operation is not being performed in the step S21, the CPU determines whether or not the second heating and dehumidifying operation is being performed in step S24. When determining that the second heating and dehumidifying operation is being performed, the CPU moves the step to step S25. On the other hand, when determining that the second heating and dehumidifying operation is not being performed, the CPU moves the step to step S28.

(Step S25)

In the case of determining that the second heating and dehumidifying operation is being performed in the step S24, the CPU determines whether or not the difference (Tc−TEO)

between the temperature Tc detected by the cooled air temperature sensor 46 and the target temperature TEO of the air flowing downstream from the heat exchanger 14 is greater than a predetermined value. When determining that the difference is greater than the predetermined value, the CPU moves the step to step S30. On the other hand, when determining that the difference is the predetermined value or smaller, the CPU moves the step to the step S26.

(Step S26)

In the case of determining that the difference (Tc−TEO) between the temperature Tc detected by the cooled air temperature 46 and the target temperature TEO of the air flowing downstream from the heat exchanger 14 is the predetermined value or smaller in the step 25, the CPU determines whether or not the difference (TCO−TH) between the target temperature TCO of the air flowing downstream from the radiator 15 and the estimated temperature TH of the air flowing downstream from the radiator 15 is greater than a predetermined value, or, determines whether or not the difference (TEO−Tc) between the target temperature TEO of the air flowing downstream from the heat exchanger 14 and the temperature Tc detected by the cooled air temperature sensor 46 is greater than a predetermined value. When determining that the difference is greater than the predetermined value, the CPU moves the step to the step S23. On the other hand, when determining that the difference is the predetermined value or smaller, the CPU moves the step to the step S27.

(Step S27)

In the case of determining that the difference (Tc−TEO) between the detected temperature Tc and the target temperature TEO is greater than the predetermined value in the S22; in the case of determining that the difference (TEO−Tc) between the target temperature TEO of the air flowing downstream from the heat exchanger 14 and the temperature Tc detected by the cooled air temperature 46 is the predetermined value or smaller in the step 26; or when determining that the difference (TCO−TH) between the target temperature TCO of the radiator 15 and the estimated temperature TH is greater than a predetermined value in step S29 described later, the CPU performs the second heating and dehumidifying operation in the step S27 and ends the process for controlling operation switching.

(Step S28)

In the case of determining that the second heating and dehumidifying operation is not being performed in the step S24, the CPU determines whether or not the cooling operation or the cooling and dehumidifying operation is being performed in the step S28. When determining that the cooling operation or the cooling and dehumidifying operation is being performed, the CPU moves the step to the step S29. On the other hand, when determining that the cooling operation or the cooling and dehumidifying operation is not being performed, the CPU ends the process for controlling operation switching.

(Step S29)

In the case of determining that the cooling operation or the cooling and dehumidifying operation is being performed in the step S28, the CPU determines whether or not the difference (TCO−TH) between the target temperature TCO of the radiator 15 and the estimated temperature TH of the air flowing downstream from the radiator 15 is greater than a predetermined value in the step 29. When determining that the difference is greater than the predetermined value, the CPU moves the step to the step S27. On the other hand, when determining that the difference is the predetermined value or smaller, the CPU moves the step to the step S30.

(Step S30)

In the case of determining that the difference (Tc−TEO) between the detected temperature Tc and the target temperature TEO is greater than the predetermined value in the step S25, or, in the case of determining that the difference (TCO−TH) between the target temperature TCO and the estimated temperature TH is the predetermined temperature or smaller in the step S29, the CPU performs the cooling operation or the cooling and dehumidifying operation in the step S30 and ends the process for controlling operation switching.

Here, the predetermined value of the difference between the temperature Tc detected by the cooled air temperature sensor 46 and the target temperature TEO of the heat exchanger 14, and the predetermined value of the difference between the target temperature TCO of the radiator 15 and the estimated temperature TH of the air downstream from the radiator 15 are both set within the range of, for example, 2 to 3 degrees Celsius. In addition, with the present embodiment, the predetermined value is calculated based on the temperature Tc detected by the cooled air temperature sensor 46, which is the temperature of the air flowing downstream from the heat exchanger 14. However, the predetermined value may be calculated based on an actual measured value of the surface temperature (between the fins) of the heat exchanger 14. Moreover, with the present embodiment, the predetermined value is calculated based on the estimated temperature TH of the air flowing downstream from the radiator 15. However, the predetermined value may be calculated based on an actual measured value of the air flowing downstream from the radiator 15.

In this way, with the vehicle air conditioning apparatus according to the present embodiment, during the cooling operation and the cooling and dehumidifying operation, the refrigerant passes through the outdoor heat exchanger 22 and passes through the supercooling radiator 24 and then absorbs the heat in the heat exchanger 14. Meanwhile, during the heating operation, the refrigerant passes through the outdoor heat exchanger 22 and then is sucked into the compressor 21 without passing through the supercooling radiator 24. Moreover, during the first heating and dehumidifying operation and the second heating and dehumidifying operation, the refrigerant passes through the radiator 15 and passes through the supercooling radiator 24, and then absorbs the heat in the heat exchanger 14. By this means, the refrigerant becomes in a supercooling state in the supercooling radiator 24 and then flows through the heat exchanger 14, and therefore it is possible to improve the efficiency of the air conditioning operation. Meanwhile, the refrigerant not supposed to flow through the heat exchanger 14 is sucked into the compressor 21 without passing through the supercooling radiator 24. Therefore, it is possible to reduce pressure loss, and consequently improve the efficiency of the air conditioning operation.

Moreover, the receiver tank 23 which can accumulate the liquid refrigerant is provided upstream from the supercooling radiator 24 in the refrigerant flow direction. By this means, it is possible to accumulate surplus refrigerant in the receiver tank 23 during the cooling operation, the cooling and dehumidifying operation, the first heating and dehumidifying operation and the second heating and dehumidifying operation, and therefore to adjust the amount of the refrigerant circulating in the refrigerant circuit 20 to a proper amount.

Moreover, the refrigerant flow passage 201 is provided, which allows the refrigerant discharged from the compressor 21 to directly flow into the outdoor heat exchanger 22. By this means, it is possible to flow the refrigerant at a high temperature into the outdoor heat exchanger 22, and therefore to shorten the defrosting time when a frost is formed on the outdoor heat exchanger 22.

Furthermore, the refrigerant flows into the outdoor heat exchanger 22 from one end of the refrigerant flow path formed in the outdoor heat exchanger 22 and is discharged from the other end. By this means, the circuit configuration of the refrigerant circuit 20 becomes simple, and therefore it is possible to reduce the manufacturing cost.

Furthermore, the outdoor heat exchanger unit U is realized by integrally form the outdoor heat exchanger 22, the receiver tank 23, the supercooling radiator 24, the first control valve 26, the first solenoid valve 28a, the second solenoid valve 28b, the third solenoid valve 28c, the first check valve 29a and the second check valve 29b. By this means, it is possible to install the outdoor heat exchanger unit U as one component, and therefore to reduce the number of steps for the installation.

Moreover, the first control valve 26 including the expansion part having the function as an electronic solenoid valve and the condensing pressure regulating part having the function as a solenoid valve which are integrally formed is provided in the refrigerant circuit 20, and the input side into which the refrigerant flows and the output side from which the refrigerant is discharged are formed as connection ports, respectively. By this means, two components having the different functions are installed as one component, and therefore it is possible to reduce the number of steps for the installation.

Furthermore, when the outlets 11c, 11d and 11e are set to the bi-level mode, the second heating and dehumidifying operation is started and stopped, based on the temperature T detected by the intake air temperature sensor 45. By this means, it is possible to efficiently perform the second heating and dehumidifying operation under the condition with a low air conditioning load, and therefore to reduce the energy consumption.

Furthermore, during the cooling and dehumidifying operation or the first heating and dehumidifying operation, the operation is switched to the second heating and dehumidifying operation, based on the temperature Tc detected by the cooled air temperature sensor 46. By this means, it is possible to perform the second heating and dehumidifying operation under the condition with a low air conditioning load, and therefore to reduce the energy consumption.

Furthermore, the temperature of the air flowing downstream from the radiator 15 is regulated by controlling the number of rotations of the compressor 21, and the temperature of the air supplied to the vehicle interior is controlled to be the target air-blowing temperature TAO by regulating the opening of the air mix damper 16. By this means, it is possible to optimize the temperature of the air supplied to the vehicle interior, and therefore to optimize the temperature-humidity environment of the vehicle interior.

Figure 13:
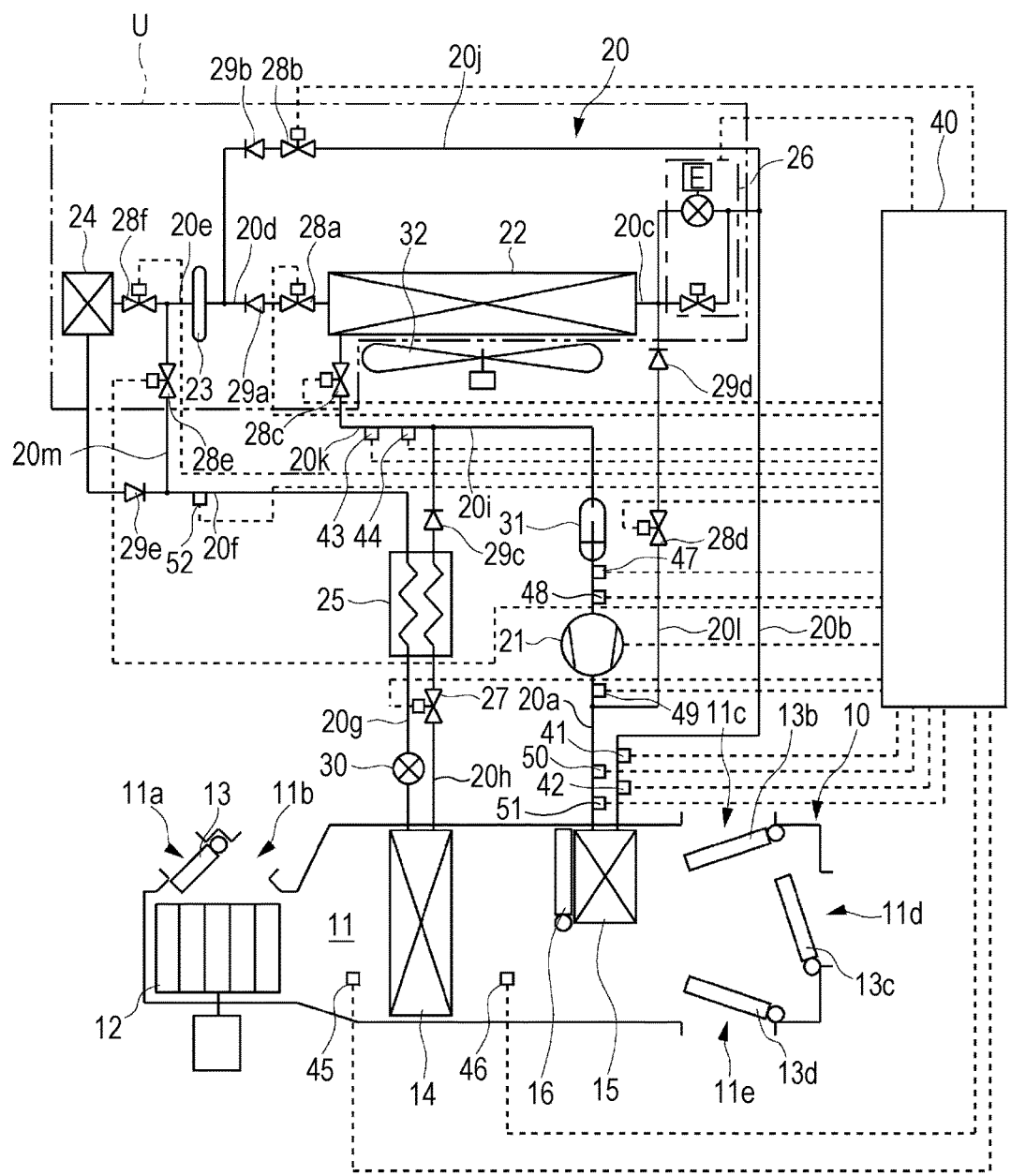
FIG. 13 is a schematic view showing the vehicle air conditioning apparatus according to Embodiment 2 of the present invention.

FIGS. 13 and 14 show Embodiment 2 of the present invention. Here, the same components are assigned the same reference numerals as in the above-described embodiment.

As shown in FIG. 13, the refrigerant flow passage 20e is connected to the refrigerant flow passage 20f, thereby to form a refrigerant flow passage 20m in the refrigerant circuit 20 of the vehicle air conditioning apparatus. A fifth solenoid valve 28e is provided in the refrigerant flow passage 20m. In addition, a sixth solenoid valve 28f is provided downstream from the connection part of the refrigerant flow passage 20e with the refrigerant flow passage 20m. Moreover, a fifth check valve 29e is provided in the upstream side of the connection part of the refrigerant flow passage 20f with the refrigerant flow passage 20m.

In the vehicle air conditioning apparatus having the above-described configuration, the opening and closing of each of the first control valve 26, the second control valve 27, the first to sixth solenoid valves 28a, 28b, 28c, 28d, 28e and 28f is switched during the cooling operation, the cooling and dehumidifying operation, the heating operation, the first heating and dehumidifying operation, the second heating and dehumidifying operation and the defrosting operation, as shown in the table of FIG. 14.

During the first heating and dehumidifying operation and the second heating and dehumidifying operation, the refrigerant having passed through the refrigerant flow passage 20d flows into the receiver tank 23 and then, flows into the heat exchanger 14 without flowing into the supercooling radiator 24.

In this way, with the vehicle air conditioning apparatus according to the present embodiment, the refrigerant becomes in a supercooling state in the supercooling radiator 24, and then flows through the heat exchanger 14 during the cooling operation and the cooling and dehumidifying operation. Therefore, it is possible to improve the efficiency of the air conditioning operation. Meanwhile, the refrigerant not supposed to flow through the heat exchanger 14 is sucked into the compressor 21 without passing through the supercooling radiator 24. Therefore, it is possible to reduce pressure loss, and consequently improve the efficiency of the air conditioning operation.

In addition, during the first heating and dehumidifying operation and the second heating and dehumidifying operation, the refrigerant discharged from the radiator 15 flows through the receiver tank 23 without flowing into the supercooling radiator 24, and then flows into the heat exchanger 14. By this means, it is possible to reduce the pressure loss during the first heating and dehumidifying operation and the second heating and dehumidifying operation. In addition, it is possible to accumulate surplus refrigerant in the receiver tank 23, and therefore to adjust the amount of the refrigerant circulating in the refrigerant circuit 20 to a proper amount.

Figure 15:
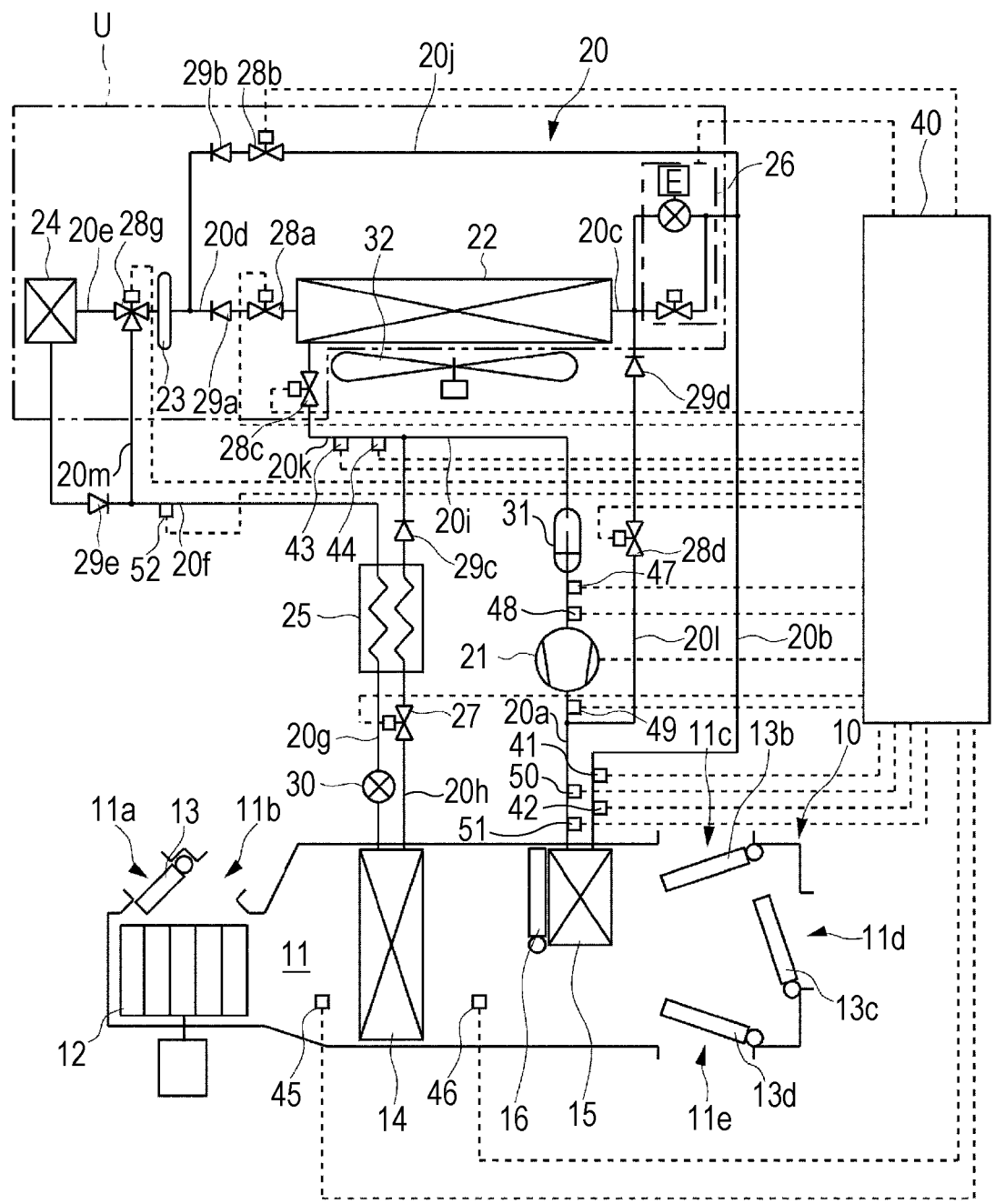
FIG. 15 is a schematic view showing the vehicle air conditioning apparatus according to Embodiment 3 of the present invention.

FIGS. 15 and 16 show Embodiment 3 of the present invention. Here, the same components are assigned the same reference numerals as in the above-described embodiment.

As shown in FIG. 15, the refrigerant flow passage 20m and the third check valve 29c are provided in the refrigerant circuit 20 of the vehicle air conditioning apparatus, like Embodiment 2. A three-way solenoid valve 28g is provided at the connection point between the refrigerant flow passage 20e and the refrigerant flow passage 20m.

In the vehicle air conditioning apparatus having the above-described configuration, the opening and closing of each of the first control valve 26, the second control valve 27, the first to forth solenoid valves 28a, 28b, 28c and 28d, and the three-way solenoid valve 28g is switched during the cooling operation, the cooling and dehumidifying operation, the heating operation, the first heating and dehumidifying operation, the second heating and dehumidifying operation and the defrosting operation, as shown in the table of FIG. 16.

During the first heating and dehumidifying operation and the second heating and dehumidifying operation, the refrigerant having passed through the refrigerant flow passage 20d flows into the receiver tank 23 and then, flows into the heat exchanger 14 without passing through the supercooling radiator 24.

In this way, with the vehicle air conditioning apparatus according to the present embodiment, the refrigerant becomes in a supercooling state in the supercooling radiator 24, and then flows through the heat exchanger 14 during the cooling operation and the cooling and dehumidifying operation. Therefore, it is possible to improve the efficiency of the air conditioning operation. Meanwhile, the refrigerant not supposed to flow through the heat exchanger 14 is sucked into the compressor 21 without passing through the supercooling radiator 24. Therefore, it is possible to reduce pressure loss, and consequently improve the efficiency of the air conditioning operation.

In addition, during the first heating and dehumidifying operation and the second heating and dehumidifying operation, the refrigerant discharged from the radiator 15 flows through the receiver tank 23 without flowing into the supercooling radiator 24, and then flows into the heat exchanger 14. By this means, it is possible to reduce the pressure loss during the first heating and dehumidifying operation and the second heating and dehumidifying operation. In addition, it is possible to accumulate surplus refrigerant in the receiver tank 23, and therefore to adjust the amount of the refrigerant circulating in the refrigerant circuit 20 to a proper amount.

Figure 17:
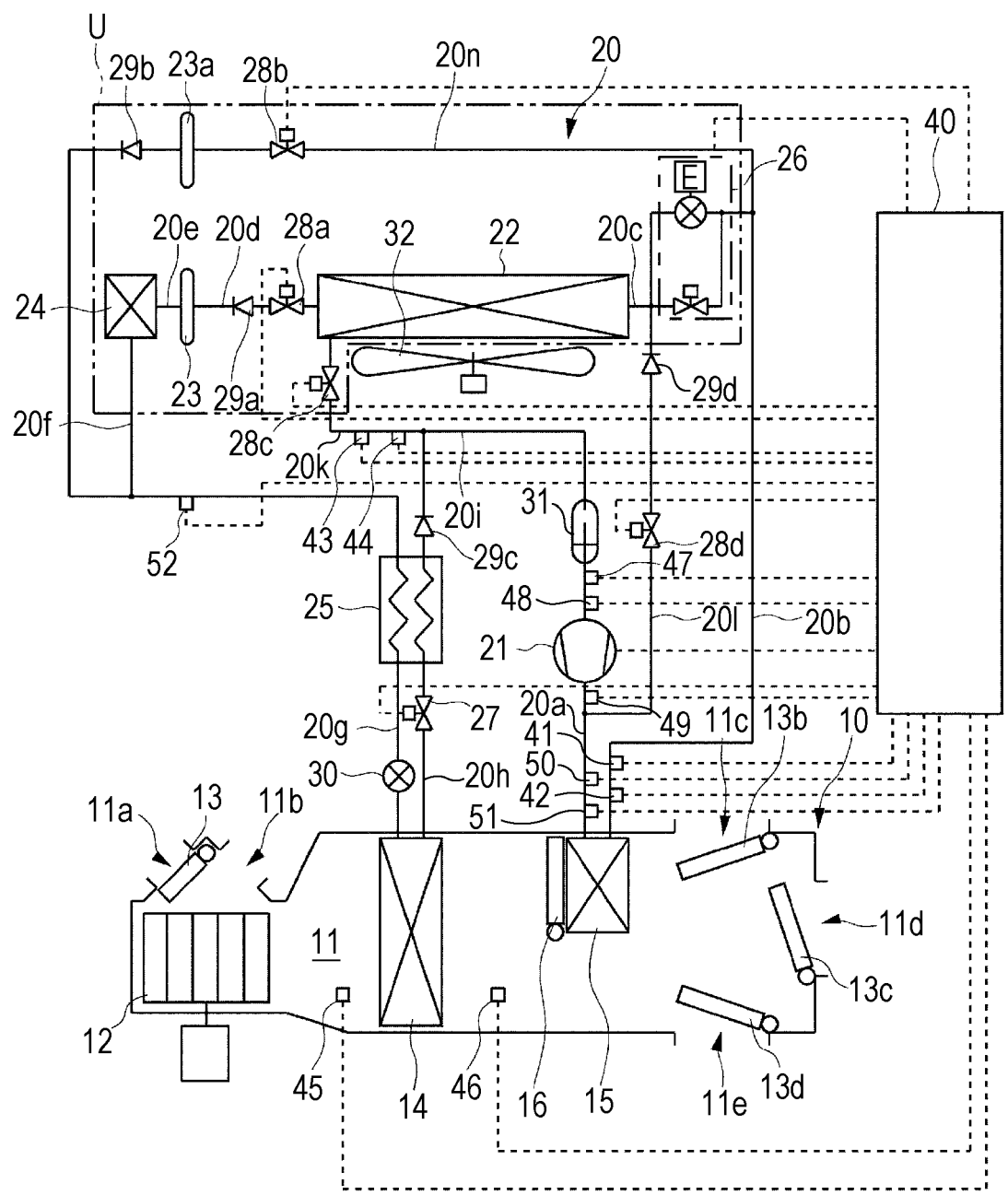
FIG. 17 is a schematic view showing the vehicle air conditioning apparatus according to Embodiment 4 of the present invention.

FIGS. 17 and 18 show Embodiment 4 of the present invention. Here, the same components are assigned the same reference numerals as in the above-described embodiment.

As shown in FIG. 17, this vehicle air conditioning apparatus includes a refrigerant flow passage 20n that connects the refrigerant flow passage 20b to the refrigerant flow passage 20f upstream from the internal heat exchanger 25, instead of the refrigerant flow passage 20j described in Embodiment 1. In the refrigerant flow passage 20n, the second solenoid valve 28b, the receiver tank 23a and the second check valve 29b are provided in the order from the upstream side.

In the vehicle air conditioning apparatus having the above-described configuration, the opening and closing of each of the first control valve 26, the second control valve 27, the first to forth solenoid valves 28a, 28b, 28c and 28d is switched during the cooling operation, the cooling and dehumidifying operation, the heating operation, the first heating and dehumidifying operation, the second heating and dehumidifying operation and the defrosting operation as shown in the table of FIG. 18.

During the first heating and dehumidifying operation and the second heating and dehumidifying operation, the refrigerant having passed through the refrigerant flow passage 20n flows into the receiver tank 23 and then, flows into the heat exchanger 14 without flowing into the supercooling radiator 24.

In this way, with the vehicle air conditioning apparatus according to the present embodiment, the refrigerant becomes in a supercooling state in the supercooling radiator 24, and then flows into the heat exchanger 14 during the cooling operation and the cooling and dehumidifying operation. Therefore, it is possible to improve the efficiency of the air conditioning operation. Meanwhile, the refrigerant not supposed to flow through the heat exchanger 14 is sucked into the compressor 21 without passing through the supercooling radiator 24. Therefore, it is possible to reduce pressure loss, and consequently improve the efficiency of the air conditioning operation.

In addition, during the first heating and dehumidifying operation and the second heating and dehumidifying operation, the refrigerant discharged from the radiator 15 flows through the receiver tank 23 without flowing into the supercooling radiator 24, and then flows into the heat exchanger 14. By this means, it is possible to reduce the pressure loss during the first heating and dehumidifying operation and the second heating and dehumidifying operation. In addition, it is possible to accumulate surplus refrigerant in the receiver tank 23, and therefore to adjust the amount of the refrigerant circulating in the refrigerant circuit 20 to a proper amount.

FIGS. 19 to 29 show Embodiment 5 of the present invention. Here, the same components are assigned the same reference numerals as in the above-described embodiment.

Figure 19:
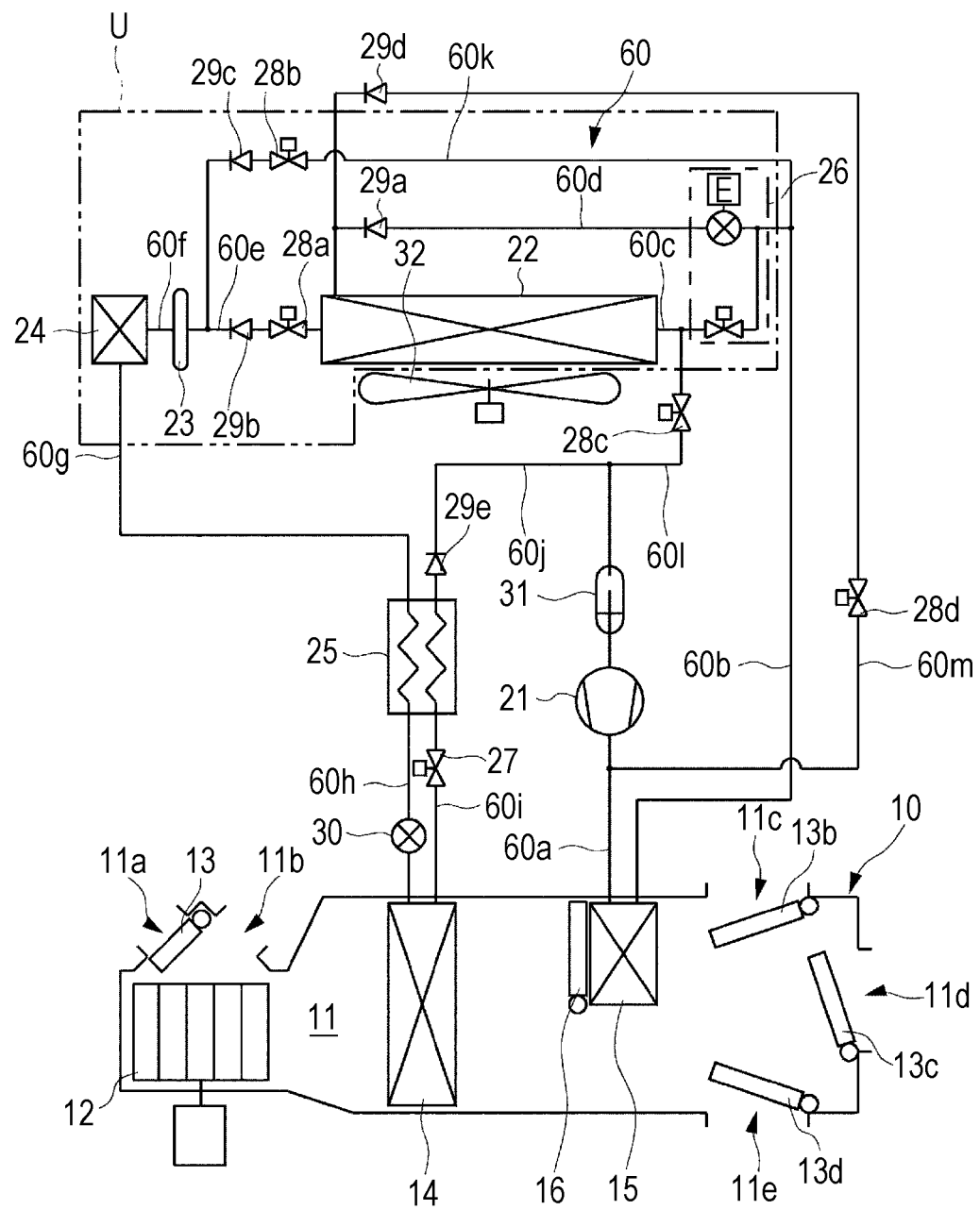
FIG. 19 is a schematic view showing the vehicle air conditioning apparatus according to Embodiment 5 of the present invention.

As shown in FIG. 19, a refrigerant circuit 60 is provided in the vehicle air conditioning apparatus.

To be more specific, the input side of the radiator 15 into which the refrigerant flows is connected to the output side of the compressor 21 from which the refrigerant is discharged to provide a refrigerant flow passage 60a. Meanwhile, the input side of the first control valve 26 into which the refrigerant flows is connected to the output side of the radiator 15 from which the refrigerant is discharged to provide a refrigerant flow passage 60b. A first connection port of the outdoor heat exchanger 22 is connected to the output side of the condensing pressure regulating part of the first control valve 26 from which the refrigerant is discharged to provide a refrigerant flow passage 60c. A second connection port of the outdoor heat exchanger 22 is connected to the output side of the expansion port of the first control valve 26 from which the refrigerant is discharged to provide a refrigerant flow passage 60d. The first check valve 29a is provided in the refrigerant flow passage 60d. The input side of the receiver tank 23 into which the refrigerant flows is connected to the third connection port of the outdoor heat exchanger 22 to provide a refrigerant flow passage 60e. In the refrigerant flow passage 60e, the first solenoid valve 28a and the second check valve 29b are provided in the order from the outdoor heat exchanger 22 side. The input side of the supercooling radiator 24 into which the refrigerant flows is connected to the output side of the receiver tank 23 from which the refrigerant is discharged to provide a refrigerant flow passage 60f. The input side of the internal heat exchanger 25 into which the high-pressure refrigerant flows is connected to the output side of the supercooling radiator 24 from which the refrigerant is discharged to provide a refrigerant flow passage 60g. The input side of the heat exchanger 14 into which the refrigerant flows is connected to the output side of the internal heat exchanger 25 form which the high-pressure refrigerant is discharged to provide a refrigerant flow passage 60h. The expansion valve 30 is provided in the refrigerant flow passage 60h. The input side of the internal heat exchanger 25 into which a low-pressure refrigerant flows is connected to the output side of the heat exchanger 14 from which the refrigerant is discharged to provide a refrigerant flow passage 60i. The second control valve 27 is provided in the refrigerant flow passage 60i. The suction side of the compressor 21 into which the refrigerant is sucked is connected to the output side of the internal heat exchanger 25 from which the low-pressure refrigerant is discharged to provide a refrigerant flow passage 60j. In the refrigerant flow passage 60j, the fifth check valve 29e and the accumulator 31 are provided in the order from the internal heat exchanger 25 side. Part of the refrigerant flow passage 60e between the first check valve 29a and the receiver tank 23 is connected to the refrigerant flow passage 60b to provide a refrigerant flow passage 60k. In the refrigerant flow passage 60k, the second solenoid valve 28b and the third check valve 29c are provided in the order from the refrigerant flow passage 60b side. In addition, in the refrigerant flow passage 60c, part of the refrigerant flow passage 60j between the internal heat exchanger 25 and the accumulator 31 to provide a refrigerant flow passage 60l. The third solenoid valve 28c is provided in the refrigerant flow passage 60*l*. The refrigerant flow passage 60*a* is connected to the refrigerant flow passage 60*d* downstream from the first check valve 29*a* in the refrigerant flow direction to provide a refrigerant flow passage 60*m*. In the refrigerant flow passage 60*m*, the fourth solenoid valve 28*d* and the fourth check valve 29*d* are provided in the order from the refrigerant flow passage 60*a* side.

Figure 20:
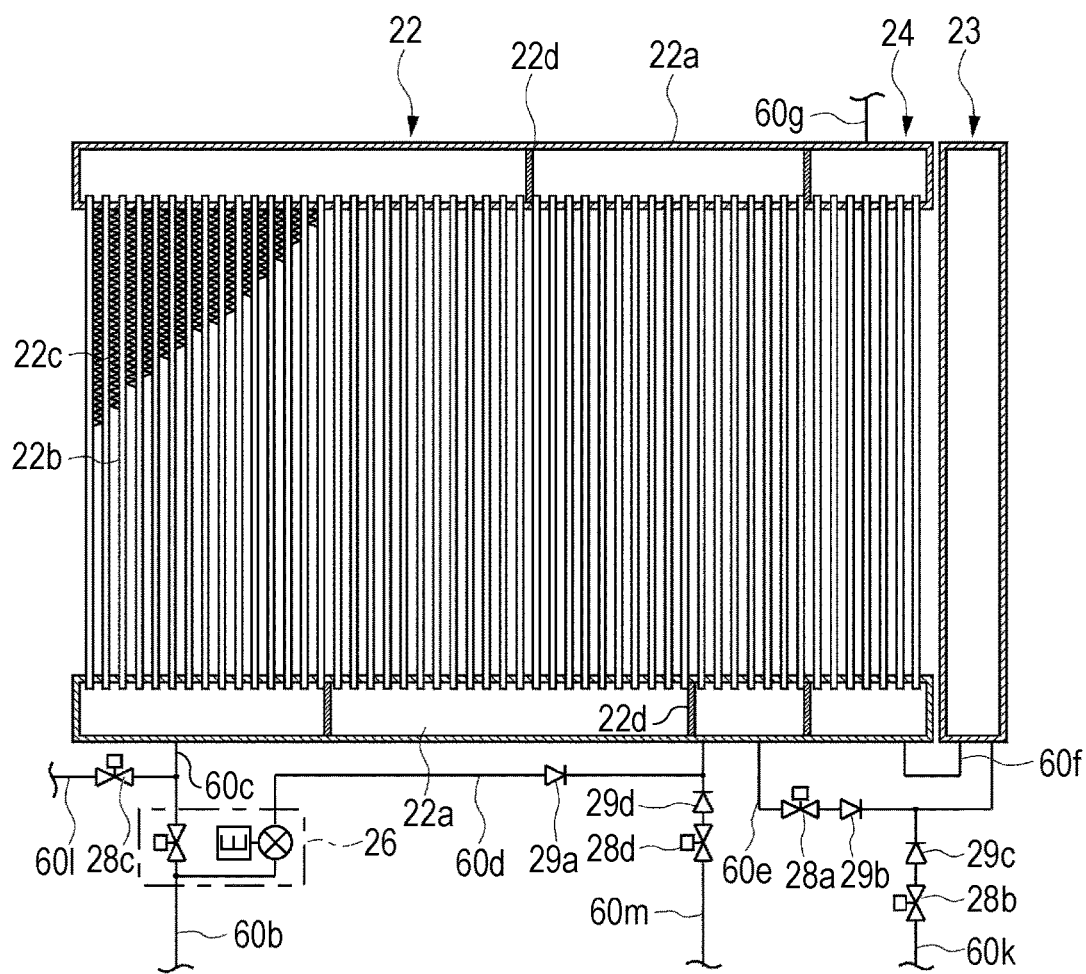
FIG. 20 shows the outdoor heat exchanger unit.
Figure 21:
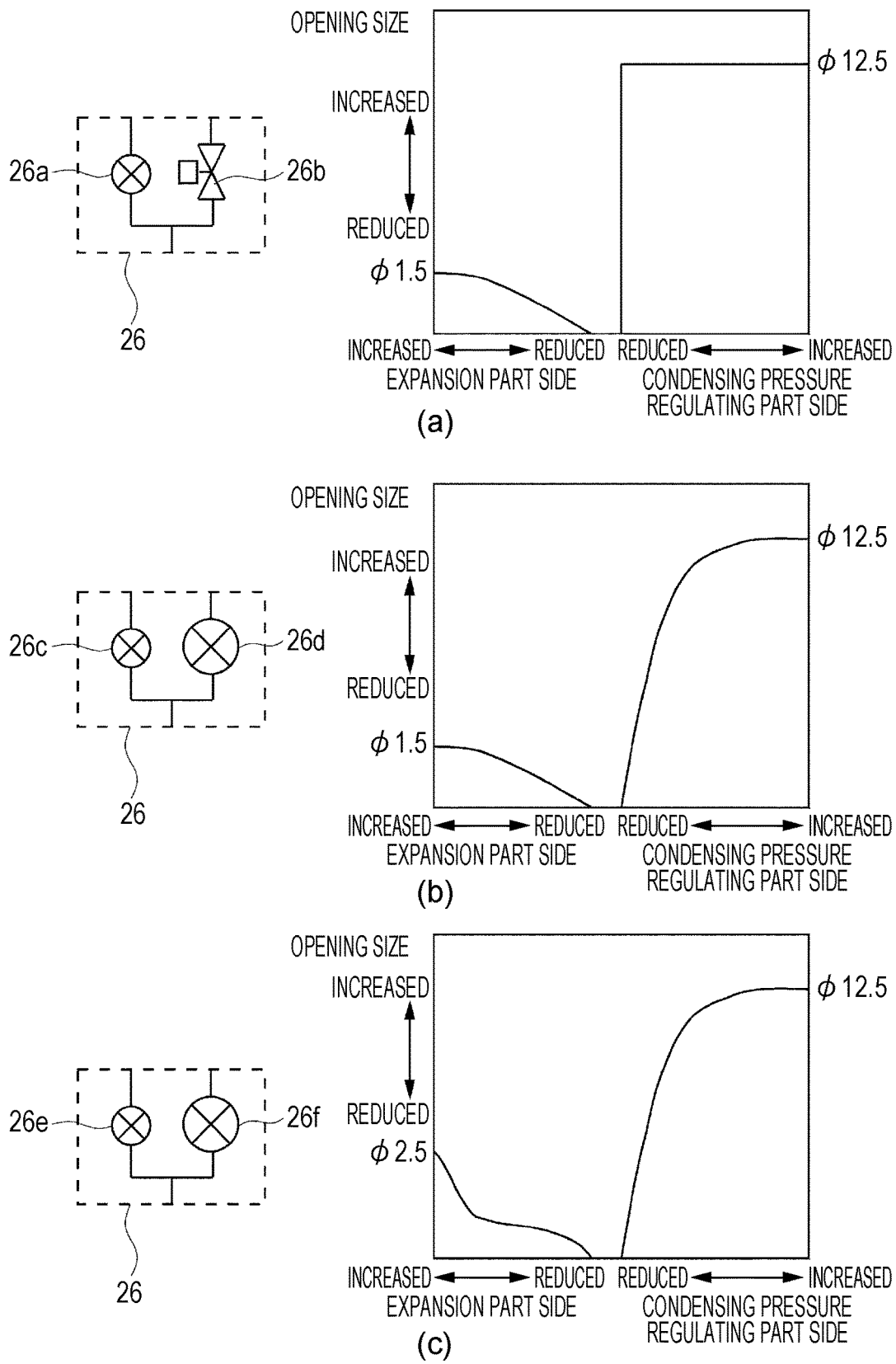
FIG. 21A is a graph showing the relationship between the valve opening and the opening area of each of the expansion part and the condensing pressure regulating part of the first control valve.
FIG. 21B is a graph showing the relationship between the valve opening and the opening area of each of the expansion part and the condensing pressure regulating part of another example of the first control valve.
FIG. 21C is a graph showing the relationship between the valve opening and the opening area of each of the expansion part and the condensing pressure regulating part of further another example of the first control valve.

As shown in FIG. 20, the outdoor heat exchanger 22 is integrally formed with the receiver tank 23, the supercooling radiator 24, the first control valve 26, the first solenoid valve 28*a*, the second solenoid valve 28*b*, the third solenoid valve 28*c*, the first check valve 29*a*, the second check valve 29*b*, the third check valve 29C and the fourth check valve 29*d*, and therefore to realize the outdoor heat exchanger unit U.

The partition members 22*d* partition each header 22*a* of the outdoor heat exchanger 22 such that the cross section of the refrigerant path decreases from the connection port of the refrigerant flow passage 60*c* to the connection port of the refrigerant flow passage 60*e*. By this means, when the outdoor heat exchanger 22 functions as a radiator, the refrigerant entering from the refrigerant flow passage 60*c* passes through the refrigerant flow path whose cross section gradually decreases, so that it is possible to reliably condense the refrigerant vapor. Meanwhile, when the outdoor heat exchanger 22 functions as an evaporator, the refrigerant entering from the refrigerant flow passage 60*d* passes through the refrigerant flow path whose cross section gradually increases. This allows the refrigerant with a greater volume due to the evaporation to smoothly flow through, so that it is possible to reduce pressure loss.

The first control valve 26 includes the refrigerant flow channel to the expansion part and the refrigerant flow channel to the condensing pressure regulating part, which are provided for one refrigerant inlet. A valve element is provided in each refrigerant flow channel to control its opening. As shown in FIG. 21A, the first control valve 26 includes the expansion part as an electronic expansion valve 26*a*, and the condensing pressure regulating part as a solenoid valve 26*b*. As seen from the graph showing each valve opening in FIG. 21A, the first control valve 26 can control the valve opening of the electronic expansion valve 26*a* between the completely closed state and the fully open state. In addition, the opening and closing of the electronic expansion valve 26*b* can be switched by turning on and off.

As another configuration of the first control valve 26, as shown in FIG. 21B, the expansion part and the condensing pressure regulating part may be a small diameter valve 26*c* and a large diameter valve 26*d*, respectively. Each of them has an optionally controllable opening. In this case, the opening of each of the small diameter valve 26*c* and the large diameter valve 26*d* is optionally controllable between the completely closed state and the fully open state.

Figure 22:
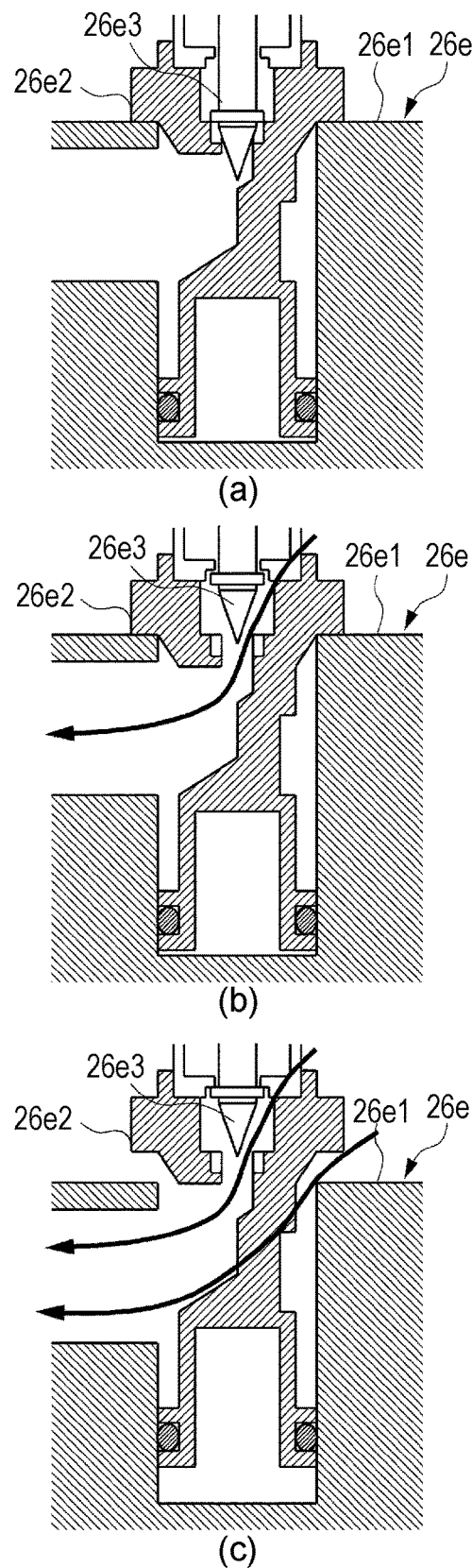
FIG. 22 shows the structure of the expansion part of the first control valve shown in FIG. 21c and explains its actions.

Moreover, as another configuration of the first control valve 26, as shown in FIG. 21C, the first control valve 26 may include a small diameter valve 26*e* and a large diameter valve 26*f* each having the opening that steeply increases near the fully open. By this means, it is possible to increase the amount of the flowing refrigerant during the defrosting operation, and therefore to shorten the time required for the defrosting operation. As shown in FIG. 22, the small diameter valve 26*a* includes a valve body 26*e*1, a valve seat 26*e*2 that can move upward and downward with respect to the valve body 26*e*1, and a needle-like valve element 26*e*3 that can move upward and downward with respect to the valve seat 26*e*2. As shown in FIG. 22A, the small diameter valve 26*e* closes the refrigerant flow channel to the valve body 26*e*1. Meanwhile, as shown in FIG. 22B, the valve element 26*e*3 moves upward to open the refrigerant flow channel, and therefore to allow the refrigerant to flow through. Moreover, as shown in FIG. 22C, the valve element 26*e*3 moves upward to move the valve seat 26*e*2 upward, and therefore to separate between the valve seat 26*e*2 and the valve body 26*e*1. By this means, it is possible to increase an amount of the refrigerant flowing through.

Furthermore, as shown in FIG. 23, another configuration of the first control valve 26 is possible where the first check valve 29*a* is integrally formed.

The vehicle air conditioning apparatus having the above-described configuration performs cooling operation, cooling and dehumidifying operation, heating operation, first heating and dehumidifying operation, second heating and dehumidifying operation, and defrosting operation. Now, each operation will be explained.

Figure 24:
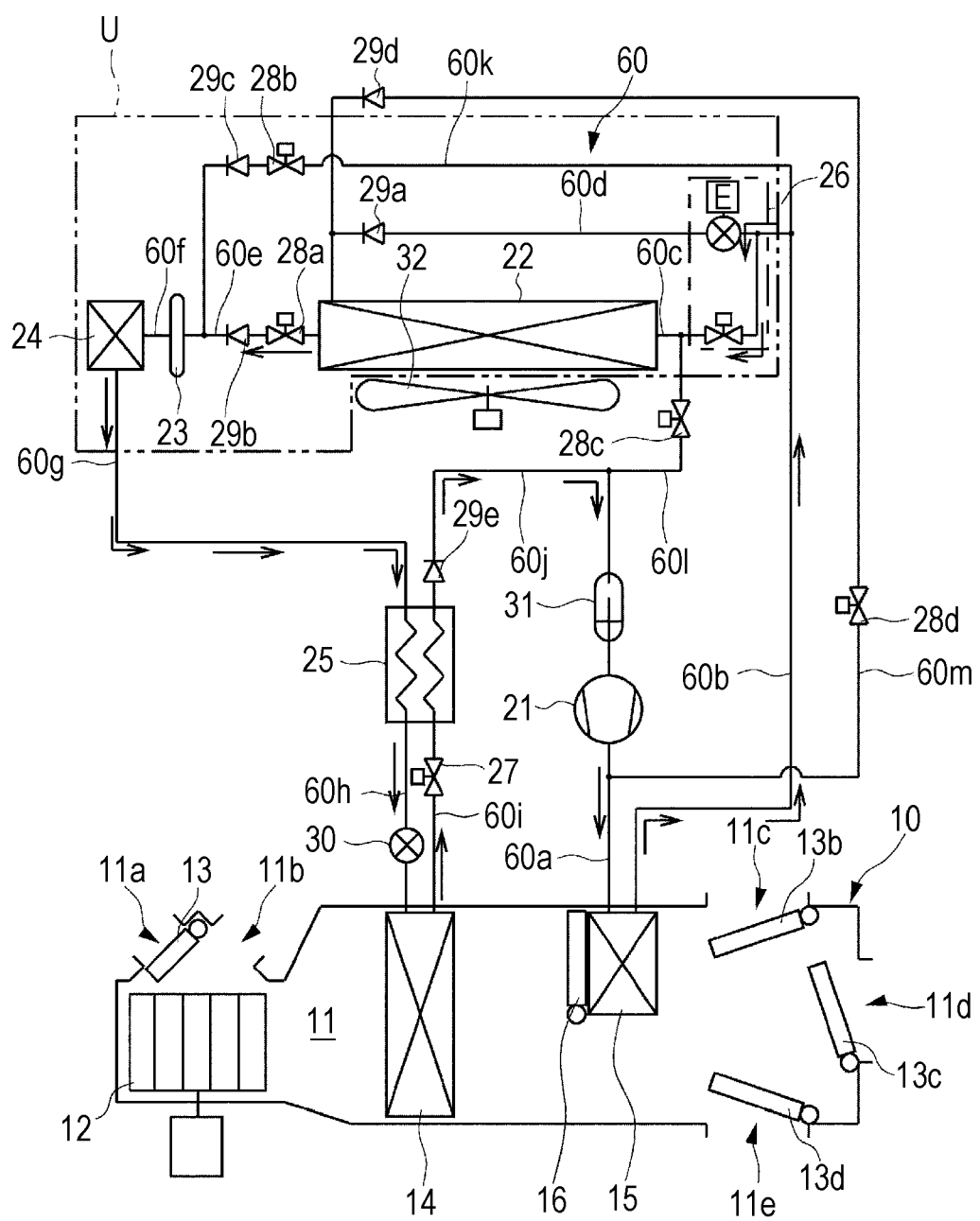
FIG. 24 is a schematic view showing the vehicle air conditioning apparatus performing a cooling operation and a cooling and dehumidifying operation.

During the cooling and dehumidifying operation, in the refrigerant circuit 60, the refrigerant flow channel to the expansion part is closed while the refrigerant flow channel to the condensing pressure regulating part is opened in the first control valve 26; the first solenoid valve 28*a* is opened; the second, third and fourth solenoid valves 28*b*, 28*c* and 28*d* are closed; and compressor 21 is operated. By this means, as shown in FIG. 24, the refrigerant discharged from the compressor 21 flows through in this order: the refrigerant flow passage 60*a*; the radiator 15; the refrigerant flow passage 60*b*; the condensing pressure regulating part of the first control valve 26; the refrigerant flow passage 60*c*; the outdoor heat exchanger 22; refrigerant flow passage 60*e*; the receiver tank 23; the refrigerant flow passage 60*f*; the supercooling radiator 24; the high-pressure side of the internal heat exchanger 25; the refrigerant flow passage 60*h*; the heat exchanger 14; the refrigerant flow passage 60*i*; the low-pressure side of the internal heat exchanger 25; and the refrigerant flow passage 60*j*, and is sucked into the compressor 21.

During the cooling operation and the cooling and dehumidifying operation, the refrigerant having passed through the outdoor heat exchanger 22 flows into the supercooling radiator 24 via the receiver tank 23. Therefore, the liquid refrigerant flowing into the supercooling radiator 24 is subjected to a heat exchange with the outdoor air and becomes in a supercooling state.

Figure 25:
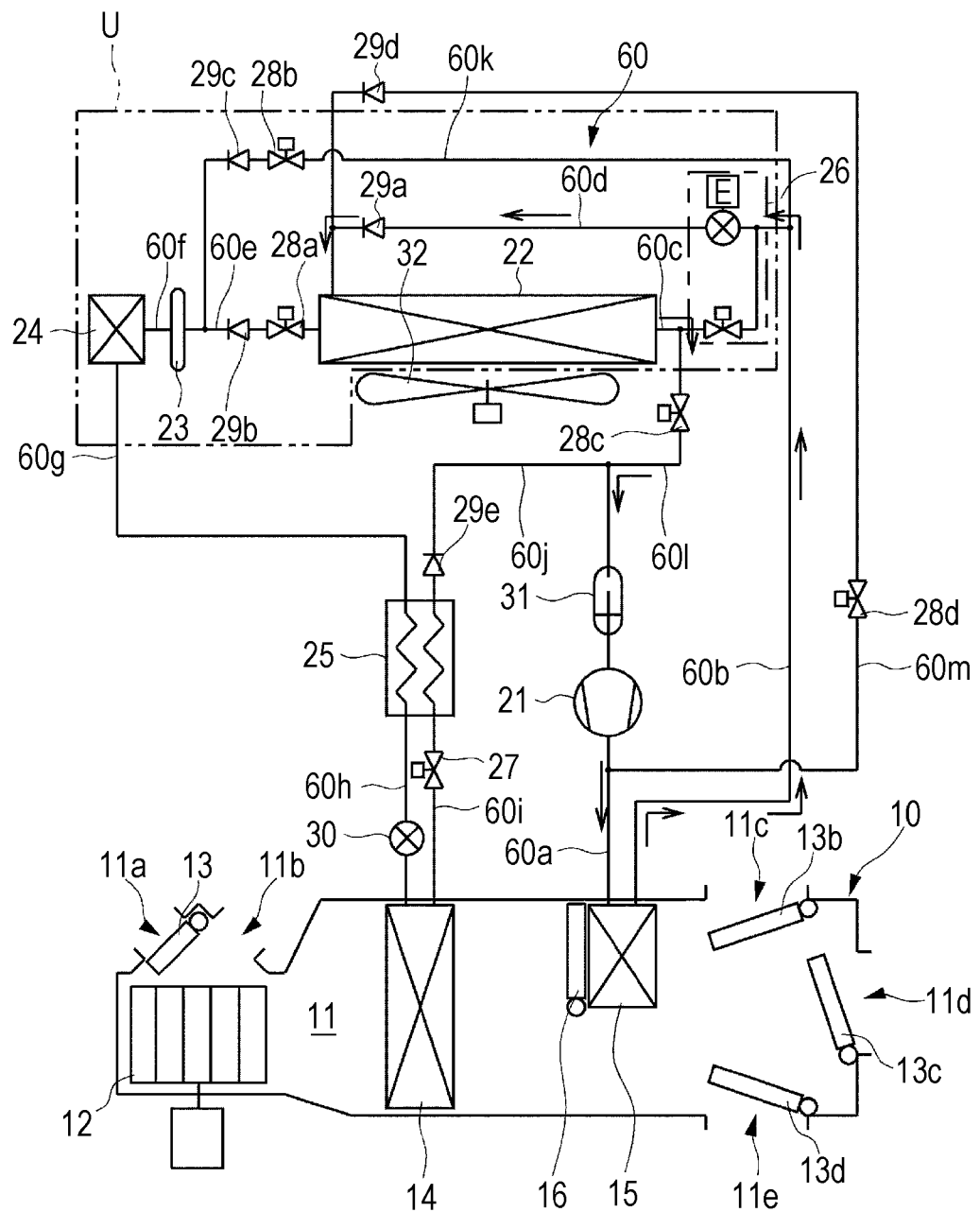
FIG. 25 is a schematic view showing the vehicle air conditioning apparatus performing a heating operation.

During the heating operation, in the refrigerant circuit 60, the refrigerant flow channel to the expansion part is opened while the refrigerant flow channel to the condensing pressure regulating part is closed in the first control valve 26; the third solenoid valve 28*c* is opened; the first, second, and fourth solenoid valves 28*a*, 28*b* and 28*d* are closed; and the compressor 21 is operated. By this means, as shown in FIG. 25, the refrigerant discharged from the compressor 21 flows through in this order: the refrigerant flow passage 60*a*; the radiator 15; the refrigerant flow passage 60*b*; the expansion part of the first control valve 26; the refrigerant flow passage 60*d*; the outdoor heat exchanger 22; and the refrigerant flow passages 60*c* and 60*l*, and is sucked into the compressor 21.

Figure 26:
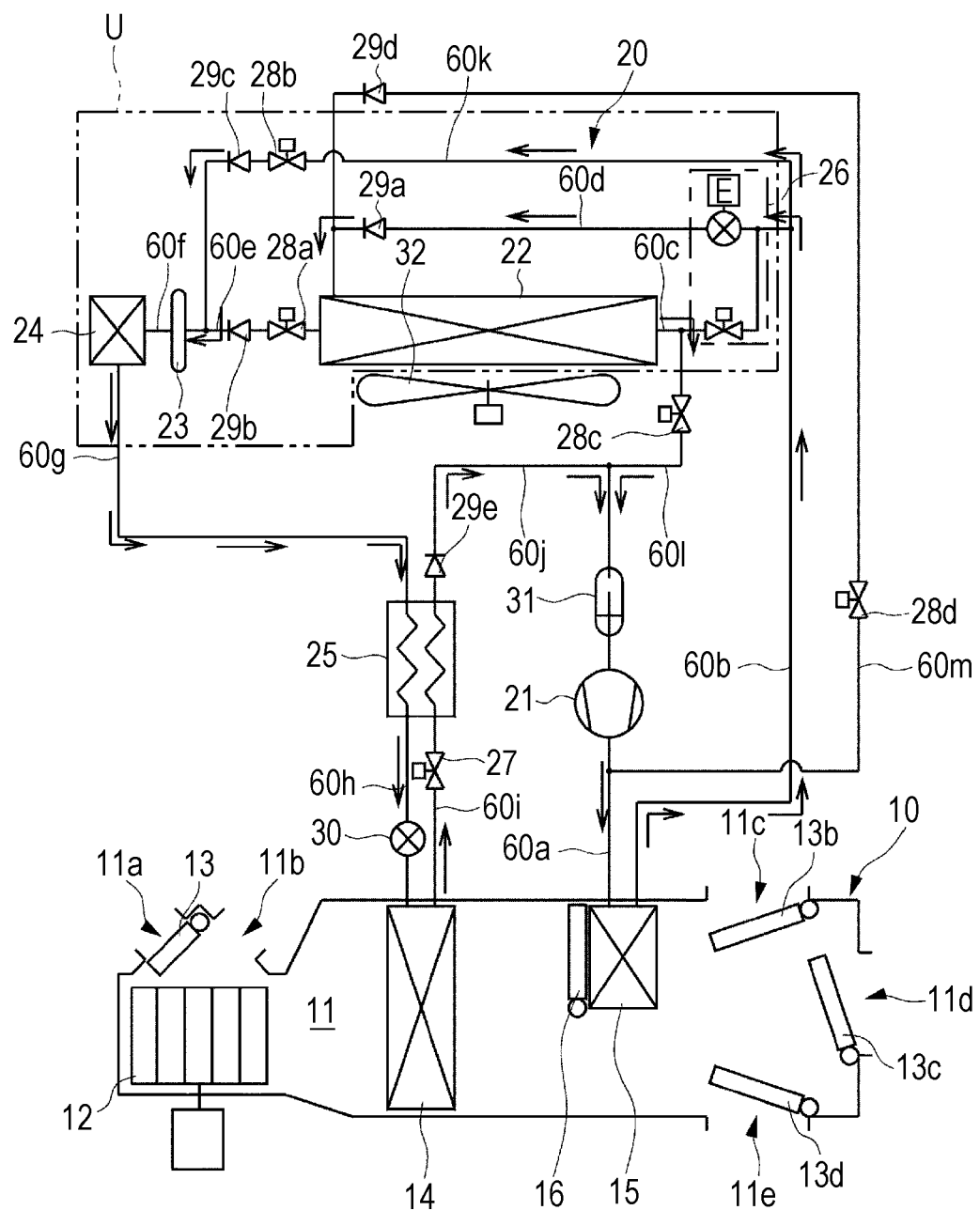
FIG. 26 is a schematic view showing the vehicle air conditioning apparatus performing a first heating and dehumidifying operation.

During the first heating and dehumidifying operation, in the refrigerant circuit 60, the refrigerant flow channel to the expansion part is opened while the refrigerant flow channel to the condensing pressure regulating part is closed in the first control valve 26; the second and third solenoid valves 28*b* and 28*c* are opened; the first and fourth solenoid valves 28*a* and 28*d* are closed; and the compressor 21 is operated. By this means, as shown in FIG. 26, the refrigerant discharged from the compressor 21 flows through in this order: the refrigerant flow passage 60*a*; the radiator 15; and the refrigerant flow passage 60b. Part of the refrigerant flowing through the refrigerant flow passage 60b flows through in this order: the expansion part of the first control valve 26; the refrigerant flow passage 60d; the outdoor heat exchanger 22; and the refrigerant flow passages 60c and 60l, and is sucked into the compressor 21. Meanwhile, the remaining refrigerant flowing through the refrigerant flow passage 60b flows through in this order: the refrigerant flow passages 60k and 60c; the receiver tank 23; the refrigerant flow passage 60f; the supercooling radiator 24, the refrigerant flow passage 60g; the high-pressure side of the internal heat exchanger 25; the refrigerant flow passage 60h; the heat exchanger 14; the refrigerant flow passage 60i; the low-pressure side of the internal heat exchanger 25; and the refrigerant flow passage 60j, and is sucked into the compressor 21.

Figure 27:
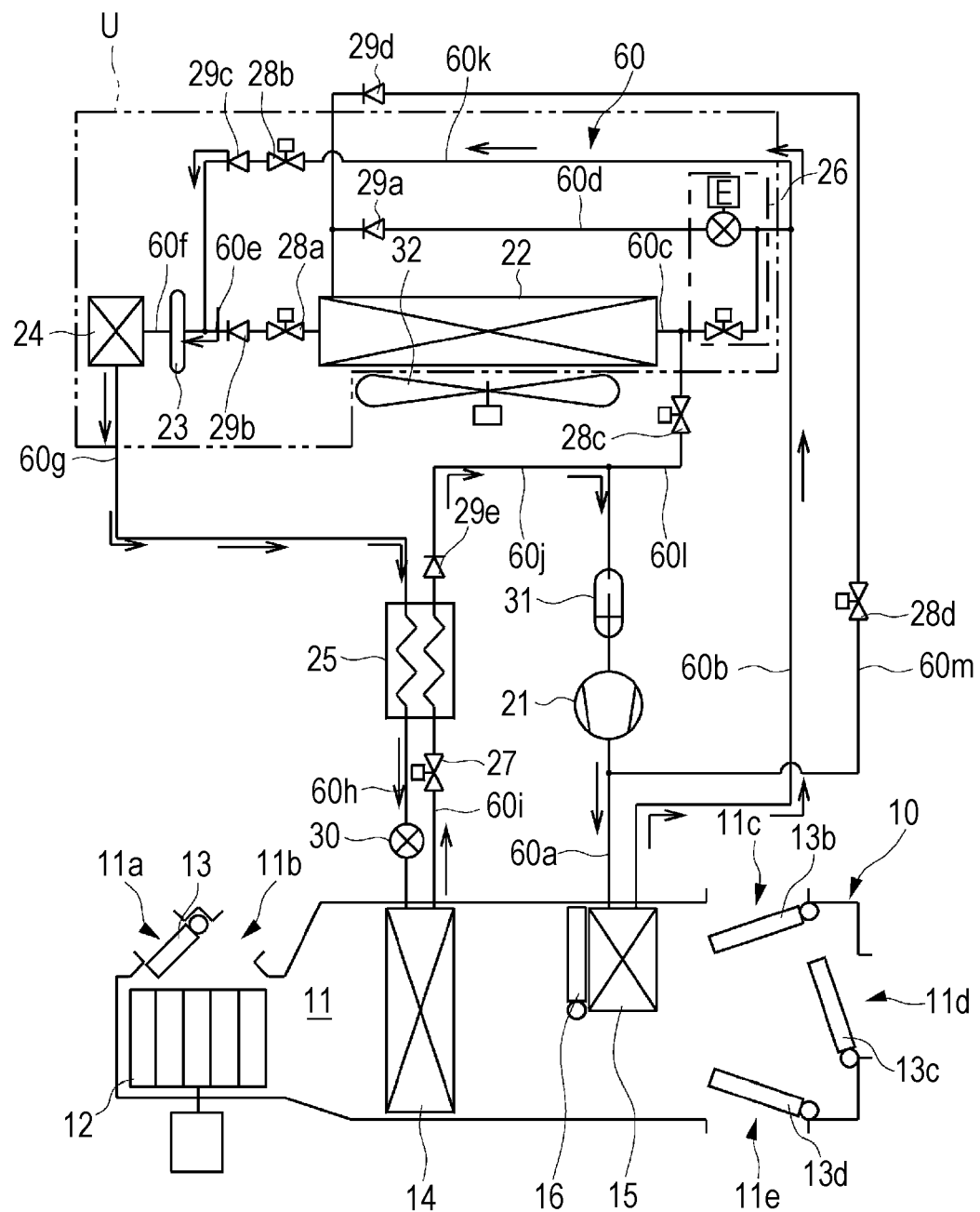
FIG. 27 is a schematic view showing the vehicle air conditioning apparatus performing a second heating and dehumidifying operation.

During the second heating and dehumidifying operation, in the refrigerant circuit 60, both the refrigerant flow channel to the expansion part and the refrigerant flow channel to the condensing pressure regulating part are closed in the first control valve 26; the second solenoid valve 28b is opened; the first, third and fourth solenoid valves 28a, 28c and 28d are closed; and the compressor 21 is operated. By this means, as shown in FIG. 27, the refrigerant discharged from the compressor 21 flows through in this order: the refrigerant flow passage 60a; the radiator 15; the refrigerant flow passages 60b, 60k and 60e; the receiver tank 23; the refrigerant flow passage 60f; the supercooling radiator 24; the refrigerant flow passage 60g; the high-pressure side of the internal heat exchanger 25; the refrigerant flow passage 60h; the heat exchanger 14; the refrigerant flow passage 60i; the low-pressure side of the internal heat exchanger 25; and the refrigerant flow passages 60j, and is sucked into the compressor 21.

Figure 28:
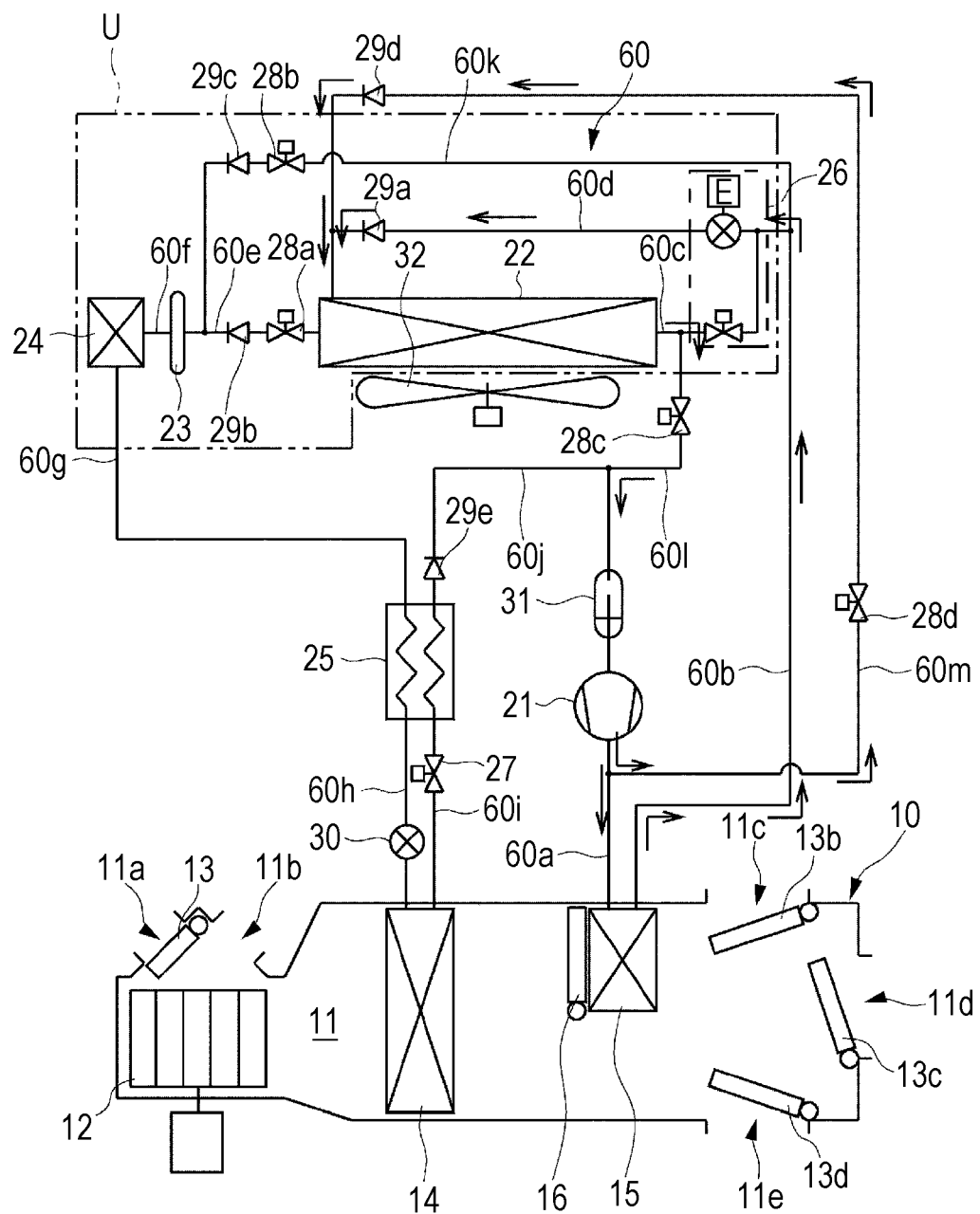
FIG. 28 is a schematic view showing the vehicle air conditioning apparatus performing a defrosting operation.

During the defrosting operation, in the refrigerant circuit 60, the refrigerant flow channel to the expansion part is opened while the refrigerant flow channel to the condensing pressure regulating part is closed in the first control valve 26; the third and fourth solenoid valves 28c and 28d are opened; and the first and second solenoid valves 28a and 28b are closed, and the compressor 21 is operated. By this means, as shown in FIG. 28, part of the refrigerant discharged from the compressor 21 flows through in this order: the refrigerant flow passage 60a; the radiator 15; the refrigerant flow passage 60b; the expansion part of the first control valve 26; and the refrigerant flow passage 30d, and is sucked into the compressor 21. Meanwhile, the remaining refrigerant discharged from the compressor 21 flows through the refrigerant flow passages 60m and 60d, and flows into the outdoor heat exchanger 22. The refrigerant discharged from the outdoor heat exchanger 22 flows through the refrigerant flow passages 60c and 60j, and is sucked into the compressor 21.

In the above-described air conditioning operations, the opening and closing of each of the first control valve 26, the second control valve 27, and the first to fourth solenoid valves 28a, 28b, 28c and 28d is switched as shown in the table of FIG. 29.

As described above, with the vehicle air conditioning apparatus according to the present embodiment, the refrigerant becomes in a supercooling state in the supercooling radiator 24, and then flows into the heat exchanger 14 during the cooling operation and the cooling and dehumidifying operation. Therefore, it is possible to improve the efficiency of the air conditioning operation. Meanwhile, the refrigerant not supposed to flow through the heat exchanger 14 is sucked into the compressor 21 without passing through the supercooling radiator 24. Therefore, it is possible to reduce pressure loss, and consequently improve the efficiency of the air conditioning operation.

In addition, the refrigerant flow path is formed in the outdoor heat exchanger 22. For heat release, the refrigerant flows into the first end of the refrigerant flow path, releases the heat, and is discharged from the second end. Meanwhile, for heat absorption, the refrigerant flows into the second end of the refrigerant flow path, absorbs the heat, and is discharged from the first end. By this means, in both the case of condensing the refrigerant and the case of evaporating the refrigerant in the outdoor heat exchanger 22, it is possible to realize the refrigerant flow path that allows the refrigerant to flow through in an optimal condition. Therefore, it is possible to improve the refrigerant condensing performance of the outdoor heat exchanger 22. Moreover, it is possible to reduce the pressure loss in evaporating the refrigerant in the outdoor heat exchanger 22.

Figure 30:
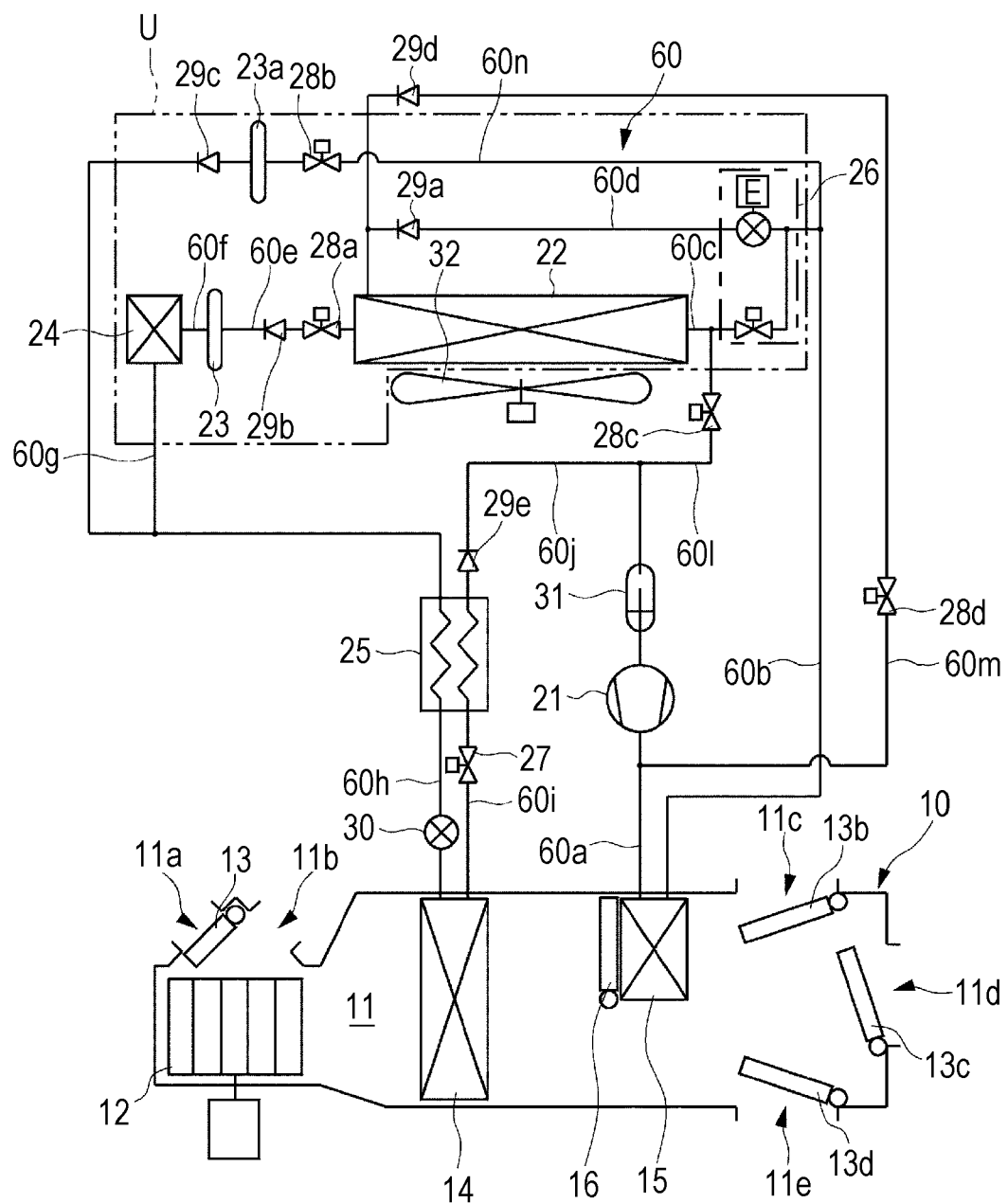
FIG. 30 is a schematic view showing the vehicle air conditioning apparatus according to Embodiment 6 of the present invention.
Figure 32:
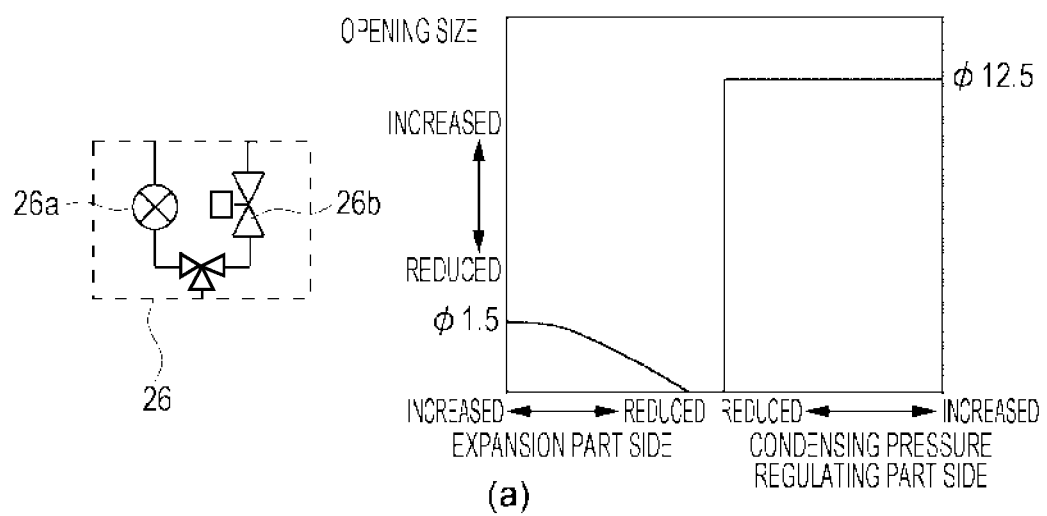
FIG. 32 is a schematic of the first control valve unit including a three-way valve.

FIGS. 30 and 31 show Embodiment 6 of the present invention. Here, the same components are assigned the same reference numerals as in the above-described embodiment.

As shown in FIG. 30, the vehicle air conditioning apparatus includes a refrigerant flow passage 60n configured to connect the refrigerant flow passage 60b to the refrigerant flow passage 60g upstream from the internal heat exchanger 25, instead of the refrigerant flow passage 60k described in Embodiment 5. In the refrigerant flow passage 60n, the second solenoid valve 28b, the receiver tank 23a and the second check valve 29b are provided in the order from the upstream side.

In the vehicle air conditioning apparatus having the above-described configuration, the opening and closing of each of the first control valve 26, the second control valve 27, the first to forth solenoid valves 28a, 28b, 28c and 28d is switched during the cooling operation, the cooling and dehumidifying operation, the heating operation, the first heating and dehumidifying operation, the second heating and dehumidifying operation and the defrosting operation, as shown in the table of FIG. 31.

During the first heating and dehumidifying operation and the second heating and dehumidifying operation, the refrigerant having passed through the refrigerant flow passage 60n flows into the receiver tank 23 and then, flows into the heat exchanger 14 without passing through the supercooling radiator 24.

As described above, with the vehicle air conditioning apparatus according to the present embodiment, the refrigerant becomes in a supercooling state in the supercooling radiator 24, and then flows into the heat exchanger 14 during the cooling operation and the cooling and dehumidifying operation. Therefore, it is possible to improve the efficiency of the air conditioning operation. Meanwhile, the refrigerant not supposed to flow through the heat exchanger 14 is sucked into the compressor 21 without passing through the supercooling radiator 24. Therefore, it is possible to reduce pressure loss, and consequently improve the efficiency of the air conditioning operation.

In addition, during the first heating and dehumidifying operation and the second heating and dehumidifying operation, the refrigerant discharged from the radiator 15 flows through the receiver tank 23 and then flows into the heat exchanger 14 without passing through the supercooling radiator 24. By this means, it is possible to reduce the pressure loss also during the first heating and dehumidifying operation and the second heating and dehumidifying operation. Moreover, it is possible to accumulate the surplus refrigerant in a receiver tank 23a, and therefore to adjust the amount of the refrigerant circulating in the refrigerant circuit 20 to a proper amount.

Here, with the above-described embodiments, a configuration has been explained where the internal heat exchanger is provided in the refrigerant circuit 20 or 60, it is by no means limiting. It is possible to produce the same effect in the embodiment without the internal heat exchanger 25.

In addition, with the embodiments, the configuration of the first control valve 26 has been described where the expansion part having a function as an electronic expansion valve and the condensing pressure regulating part having a function as a solenoid valve are integrally formed. However, it is by no means limiting. Another configuration is possible where, for example, the first control valve 26 includes a three-way valve that can switch the refrigerant outlet from one to the other and an expansion valve provided in one refrigerant outlet.

Moreover, although with the embodiments, the expansion valve 30 has been described as a temperature expansion valve, it is by no means limiting, and an electronic expansion valve is applicable.

REFERENCE SIGNS LIST 10 air conditioning unit
11 air flow passage
14 heat exchanger
15 radiator
20 refrigerant circuit
21 compressor
22 outdoor heat exchanger
23, 23a receiver tank
24 supercooling radiator
26 first control valve
27 second control valve
28a, 28b, 28c, 28d first to fourth solenoid valve
29a, 29b, 29c, 29d, 29e first to fifth check valve
30 expansion valve
40 controller
60 refrigerant circuit

The invention claimed is:

1. A vehicle air conditioning apparatus comprising:
   a compressor configured to compress and discharge a refrigerant;
   a radiator configured to release heat from the refrigerant;
   a heat exchanger configured to absorb the heat into the refrigerant;
   an outdoor heat exchanger configured to release the heat from or absorb the heat into the refrigerant;
   an outdoor radiator configured to further release the heat from the refrigerant having released the heat in the outdoor heat exchanger;
   a first operable mode comprising a cooling and/or cooling and dehumidifying refrigerant circuit configured to allow the refrigerant discharged from the compressor to flow into the radiator, to allow the refrigerant having passed through the radiator to flow into the outdoor heat exchanger, to allow the refrigerant having passed through the outdoor heat exchanger to flow into the outdoor radiator, to allow the refrigerant having passed through the outdoor radiator to flow into the heat exchanger via an expansion valve and to allow the refrigerant having passed through the heat exchanger to be sucked into the compressor;
   a second operable mode comprising a heating refrigerant circuit configured to allow the refrigerant discharged from the compressor to flow into the radiator, to allow the refrigerant having passed through the radiator to flow into the outdoor heat exchanger via an expansion part, and to allow the refrigerant having passed through the outdoor heat exchanger to be sucked into the compressor;
   a third operable mode comprising a first heating and dehumidifying refrigerant circuit configured to allow the refrigerant discharged from the compressor to flow into the radiator, to allow part of the refrigerant having passed through the radiator to flow into the outdoor heat exchanger via the expansion part, to allow remaining refrigerant having passed through the radiator to flow into the outdoor radiator, to allow the refrigerant having passed through the outdoor radiator to flow into the heat exchanger via the expansion valve, and to allow the refrigerant having passed through the outdoor heat exchanger and the refrigerant having passed though the heat exchanger to be sucked into the compressor;
   a fourth operable mode comprising a second heating and dehumidifying refrigerant circuit configured to allow the refrigerant discharged from the compressor to flow into the radiator, to allow the refrigerant having passed through the radiator to flow into the outdoor radiator, to allow the refrigerant having passed through the outdoor radiator to flow into the heat exchanger via the expansion valve, and to allow the refrigerant having passed through the heat exchanger to be sucked into the compressor;
   an air flow passage configured to allow air to be supplied to a vehicle interior to pass through, the heat exchanger being disposed in an upstream side of an air flow direction of the air flow passage, and the radiator being disposed downstream from the heat exchanger;
   an outlet switching part configured to switch modes among: a vent mode to blow the air flowing through the air flow passage toward a head of a passenger in the vehicle interior, a foot mode to blow the air toward feet of the passenger in the vehicle interior, and a bi-level mode to blow the air toward the head and the feet of the passenger in the vehicle interior, based on a target air-blowing temperature of the air to be supplied to the vehicle interior in order to set the temperature of the vehicle interior to a target preset temperature;
   an intake air temperature detector configured to detect a temperature of the air flowing into the air flow passage; and
   a heating and dehumidifying controller configured to start or stop an operation for the second heating and dehumidifying refrigerant circuit, based on the temperature detected by the intake air temperature detector, when the outlet switching part sets the bi-level mode.

2. The vehicle air conditioning apparatus according to claim 1, further comprising a receiver tank configured to accumulate a liquid refrigerant, the receiver tank being provided upstream from the outdoor radiator in a refrigerant flow direction.

3. The vehicle air conditioning apparatus according to claim 1, further comprising:
   a receiver tank configured to accumulate a liquid refrigerant; and
   the first heating and dehumidifying refrigerant circuit configured to allow the refrigerant discharged from the compressor to flow into the radiator, to allow part of the refrigerant having passed through the radiator to flow into the outdoor heat exchanger via the expansion part, to allow remaining refrigerant having passed through the radiator to flow into the receiver tank without flowing into the outdoor radiator, to allow the refrigerant having passed through the receiver tank to flow into the heat exchanger via the expansion valve, and to allow the refrigerant having passed through the outdoor heat exchanger and the refrigerant having passed through the heat exchanger to be sucked into the compressor.

4. The vehicle air conditioning apparatus according to claim 3, further comprising:

the second heating and dehumidifying refrigerant circuit configured to allow the refrigerant discharged from the compressor to flow into the radiator, to allow the refrigerant having passed through the radiator to flow into the receiver tank without flowing into the outdoor radiator, to allow the refrigerant having passed through the receiver tank to flow into the heat exchanger via the expansion valve, and to allow the refrigerant having passed through the heat exchanger to be sucked into the compressor.

5. The vehicle air conditioning apparatus according to claim 1, further comprising:

an air temperature detector configured to detect the temperature of the air flowing through the air flow passage; and an operation switching part configured to switch an operation for the first heating and dehumidifying refrigerant circuit or the cooling and/or cooling and dehumidifying refrigerant circuit to the operation for the second heating and dehumidifying refrigerant circuit, based on the temperature detected by the air temperature detector.

6. The vehicle air conditioning apparatus according to claim 1, further comprising:

a heated air temperature estimator configured to estimate the temperature of the air flowing downstream from the radiator in the air flow passage;

a compressor controller configured to control a number of rotations of the compressor based on the temperature estimated by the heated air temperature estimator;

an air mix damper configured to change a percentage of the air flowing through the air flow passage that is subjected to a heat exchange with the refrigerant flowing through the radiator, wherein the percentage of the air increases when an opening of the air mix damper is greater; and a damper opening controller configured to control the opening of the air mix damper such that the temperature of the air supplied to the vehicle interior is the target air-blowing temperature.

7. The vehicle air conditioning apparatus according to claim 4, further comprising:

an air flow passage configured to allow air to be supplied to a vehicle interior to pass through, the heat exchanger being disposed in an upstream side of an air flow direction of the air flow passage, and the radiator being disposed downstream from the heat exchanger;

a heat exchanger temperature detector configured to detect a surface temperature of the heat exchanger or the temperature of the air flowing downstream from the heat exchanger in the air flow passage;

a radiator temperature detector configured to detect or estimate the temperature of the air flowing downstream from the radiator in the air flow passage; and an operable mode switching controller configured to switch the operable mode among the operable mode for the cooling and/or cooling and dehumidifying refrigerant circuit, the operable mode for the first heating and dehumidifying refrigerant circuit and the operable mode for the second heating and dehumidifying refrigerant circuit, based on the temperature detected by a cooled air temperature detector or a temperature estimated by a heated air temperature estimator.

8. The vehicle air conditioning apparatus according to claim 7, further comprising:

a defrosting circuit configured to allow at least part of the refrigerant discharged from the compressor directly into the outdoor heat exchanger.

9. The vehicle air conditioning apparatus according to claim 7, further comprising an outdoor heat exchanger unit including the outdoor heat exchanger, the outdoor radiator, the receiver tank, a refrigerant flow passage that connects between the outdoor heat exchanger and the receiver tank; and a valve provided in the refrigerant flow passage, which are integrally formed.

10. The vehicle air conditioning apparatus according to claim 1, further comprising a control valve unit, the control valve unit including:

the expansion part configured to decompress the refrigerant flowing into the outdoor heat exchanger when the refrigerant absorbs heat in the outdoor heat exchanger; and a flow regulating part configured to regulate an amount of the refrigerant flowing into the outdoor heat exchanger when the refrigerant releases heat in the outdoor heat exchanger, wherein the expansion part and the flow regulating part are integrally formed, wherein each of the expansion part and the flow regulating part has a refrigerant inlet and an refrigerant outlet, and the control valve unit includes a piping connection port configured to allow communication with at least the refrigerant inlet of each of the expansion part and the flow regulating part.

11. The vehicle air conditioning apparatus according to claim 10, wherein the control valve unit includes a three-way valve that can switch a refrigerant outlet of the control valve unit between the expansion part and the flow regulating part; and the expansion valve provided in the refrigerant outlet of the expansion part.

12. The vehicle air conditioning apparatus according to claim 10, wherein the expansion part is an electronic expansion valve and the flow regulating part is a solenoid valve.

* * * * *